(12) United States Patent
Tanaka et al.

(10) Patent No.: US 10,755,482 B2
(45) Date of Patent: Aug. 25, 2020

(54) INFORMATION PROCESSING DEVICE AND INFORMATION PROCESSING METHOD

(71) Applicant: SONY CORPORATION, Tokyo (JP)

(72) Inventors: Tomohisa Tanaka, Tokyo (JP); Tsubasa Tsukahara, Tokyo (JP); Ryo Fukazawa, Kanagawa (JP); Akane Yano, Tokyo (JP); Kenji Sugihara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/086,876

(22) PCT Filed: Feb. 1, 2017

(86) PCT No.: PCT/JP2017/003644
§ 371 (c)(1),
(2) Date: Sep. 20, 2018

(87) PCT Pub. No.: WO2017/169081
PCT Pub. Date: Oct. 5, 2017

(65) Prior Publication Data
US 2019/0088021 A1 Mar. 21, 2019

(30) Foreign Application Priority Data
Mar. 29, 2016 (JP) .................. 2016-066277

(51) Int. Cl.
*G06T 19/00* (2011.01)
*G09G 5/38* (2006.01)
(Continued)

(52) U.S. Cl.
CPC .......... *G06T 19/006* (2013.01); *G02B 27/017* (2013.01); *G02B 27/0172* (2013.01);
(Continued)

(58) Field of Classification Search
CPC ................................. G06T 19/006
(Continued)

(56) References Cited

U.S. PATENT DOCUMENTS

2005/0024388 A1  2/2005  Takemoto
2011/0304540 A1* 12/2011  Nishimoto .............. A63F 13/42
                                                345/158

(Continued)

FOREIGN PATENT DOCUMENTS

CN    104076513 A    10/2014
EP    1503348 A2     2/2005
(Continued)

OTHER PUBLICATIONS

International Search Report and Written Opinion of PCT Application No. PCT/JP2017/003644, dated Apr. 18, 2017, 11 pages of ISRWO.

*Primary Examiner* — Thomas J Lett
(74) *Attorney, Agent, or Firm* — Chip Law Group

(57) ABSTRACT

Provided is a mechanism that can prevent deterioration in a sense of immersion or a sense of reality of a user with respect to a virtual object displayed in a display area from deteriorating. An information processing device includes a display control unit that controls display of a virtual object displayed to be moved in a display area, and change an aspect of the virtual object when the virtual object moves across a boundary of the display area. An information processing method is performed using a processor, the information processing method including controlling display of a virtual object displayed to be moved in a display area, and changing an aspect of the virtual object when the virtual object moves across a boundary of the display area.

20 Claims, 16 Drawing Sheets

(51) Int. Cl.
*G06F 3/01* (2006.01)
*G09G 5/00* (2006.01)
*G09G 5/377* (2006.01)
*G06F 3/147* (2006.01)
*G09G 5/10* (2006.01)
*G02B 27/01* (2006.01)
*G09G 5/36* (2006.01)
*G09G 5/373* (2006.01)
*G06T 5/00* (2006.01)

(52) U.S. Cl.
CPC ........... *G02B 27/0179* (2013.01); *G06F 3/01* (2013.01); *G06F 3/011* (2013.01); *G06F 3/147* (2013.01); *G09G 5/00* (2013.01); *G09G 5/10* (2013.01); *G09G 5/36* (2013.01); *G09G 5/373* (2013.01); *G09G 5/377* (2013.01); *G09G 5/38* (2013.01); *G02B 2027/014* (2013.01); *G02B 2027/0187* (2013.01); *G06T 5/002* (2013.01); *G06T 2210/62* (2013.01); *G09G 2320/0261* (2013.01); *G09G 2320/066* (2013.01); *G09G 2320/0626* (2013.01); *G09G 2340/0492* (2013.01); *G09G 2340/10* (2013.01)

(58) Field of Classification Search
USPC ......................................................... 345/633
See application file for complete search history.

(56) References Cited

U.S. PATENT DOCUMENTS

| | | | |
|---|---|---|---|
| 2014/0125698 | A1 | 5/2014 | Latta et al. |
| 2014/0267775 | A1* | 9/2014 | Lablans ............... H04N 5/2624 348/169 |
| 2015/0049112 | A1* | 2/2015 | Liu ....................... G06T 19/006 345/633 |
| 2016/0033770 | A1 | 2/2016 | Fujimaki et al. |
| 2018/0232941 | A1* | 8/2018 | Tsukahara ............ G02B 27/017 |

FOREIGN PATENT DOCUMENTS

| | | |
|---|---|---|
| EP | 2394718 A2 | 12/2011 |
| EP | 2979446 A1 | 2/2016 |
| JP | 2005-049996 A | 2/2005 |
| JP | 2011-258161 A | 12/2011 |
| JP | 2013-109203 A | 6/2013 |
| JP | 2014-186361 A | 10/2014 |
| JP | 2015-084150 A | 4/2015 |
| KR | 10-2015-0134409 A | 12/2015 |
| WO | 2014/156033 A1 | 10/2014 |

* cited by examiner

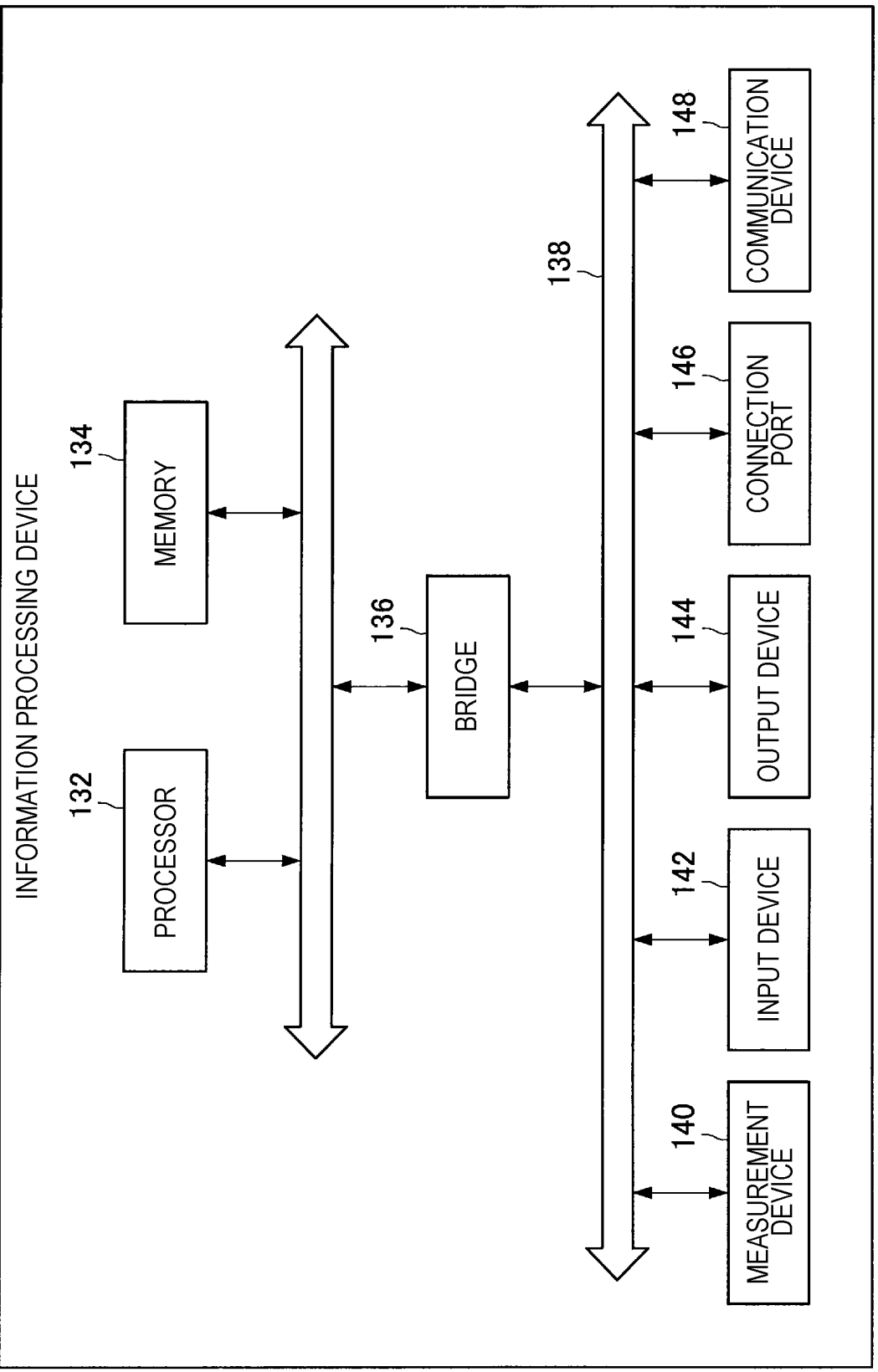

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2017/003644 filed on Feb. 1, 2017, which claims priority benefit of Japanese Patent Application No. JP 2016-066277 filed in the Japan Patent Office on Mar. 29, 2016. Each of the above-referenced applications is hereby incorporated herein by reference in its entirety.

TECHNICAL FIELD

The present disclosure relates to an information processing device, an information processing method, and a program.

BACKGROUND ART

As information processing technologies and display technologies have been developed in recent years, technologies for displaying videos that give a sense of reality have been provided. As such a technology, there is an augmented reality (AR) technology.

Patent Literature 1, for example, discloses an invention related to an information processing device for controlling a user interface displayed to be superimposed on a real object (e.g., a television device) that is an outside world image to be operated on the basis of gestures of a user using a head-mounted display (HMD). In addition, Patent Literature 2 discloses an invention related to a physical structure of a transmissive-type HMD.

CITATION LIST

Patent Literature

Patent Literature 1: JP 2014-186361A
Patent Literature 2: JP 2013-109203A

DISCLOSURE OF INVENTION

Technical Problem

In the related art, however, there are cases in which a sense of immersion or a sense of reality with respect to displayed content of an HMD deteriorates. For example, a display area (e.g., a display area of an HMD) in which a virtual object such as the above-described user interface can be displayed is limited. For this reason, when the virtual object moves to the outside from the inside of the display area and disappears, the virtual object will disappear from a part of the virtual object coming in a boundary between the display area and the area in which no virtual object can be displayed (which will also be referred to as a boundary of a display area below). Accordingly, a user may be conscious of the boundary of the display area, and thus a sense of immersion or a sense of reality with respect to the displayed content may deteriorate.

Therefore, the present disclosure proposes a mechanism that can prevent deterioration in a sense of immersion or a sense of reality of a user with respect to a virtual object displayed in a display area from deteriorating.

Solution to Problem

According to the present disclosure, there is provided an information processing device including: a display control unit configured to control display of a virtual object displayed to be moved in a display area, and change an aspect of the virtual object when the virtual object moves across a boundary of the display area.

In addition, according to the present disclosure, there is provided an information processing method performed using a processor, the information processing method including: controlling display of a virtual object displayed to be moved in a display area, and changing an aspect of the virtual object when the virtual object moves across a boundary of the display area.

In addition, according to the present disclosure, there is provided a program for causing a computer system to achieve: a display control function of controlling display of a virtual object displayed to be moved in a display area, and changing an aspect of the virtual object when the virtual object moves across a boundary of the display area.

Advantageous Effects of Invention

According to the present disclosure described above, a mechanism that can prevent deterioration of a sense of immersion or a sense of reality of a user with respect to a virtual object displayed in a display area from deteriorating is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 16 is an explanatory diagram illustrating a hardware configuration of an information processing device according to an embodiment of the present disclosure.

MODE(S) FOR CARRYING OUT THE INVENTION

Figure 1:
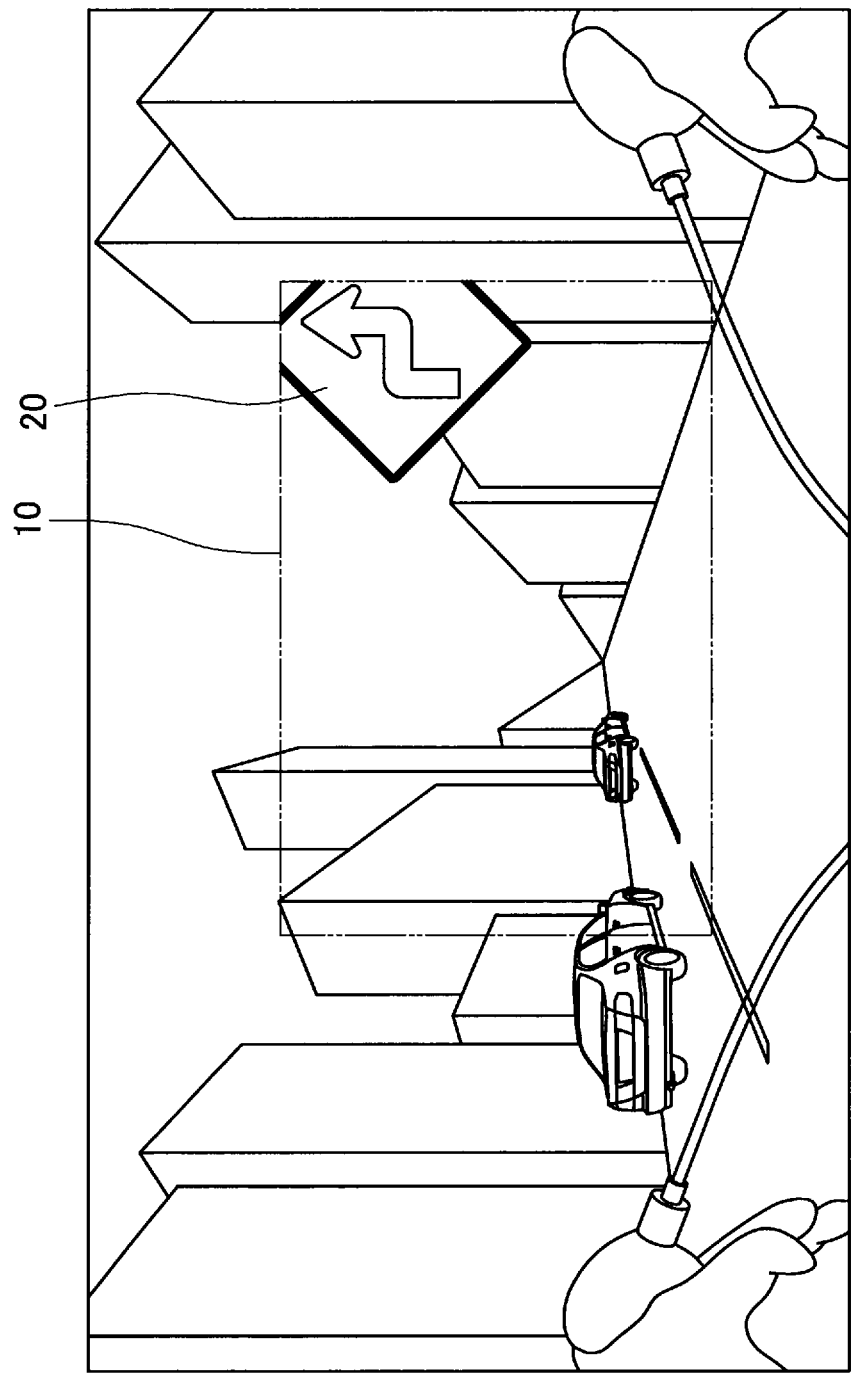
FIG. 1 is a diagram for describing an example of a display in an AR technology.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, there may be cases in the present specification and drawings in which a plurality of structural elements with substantially the same functional configuration are distinguished from each other by giving different numbers at the end of the same reference numerals. For example, a plurality of configurations with substantially the same function are distinguished when necessary, like a display area 10A and a display area 10B. However, in a case in which there is no need to distinguish substantially the same functional configurations, only the same reference numerals are given. For example, in a case in which there is no particular need to distinguish a display area 10A from a display area 10B, they will be referred to simply as display areas 10.

Figure 2:
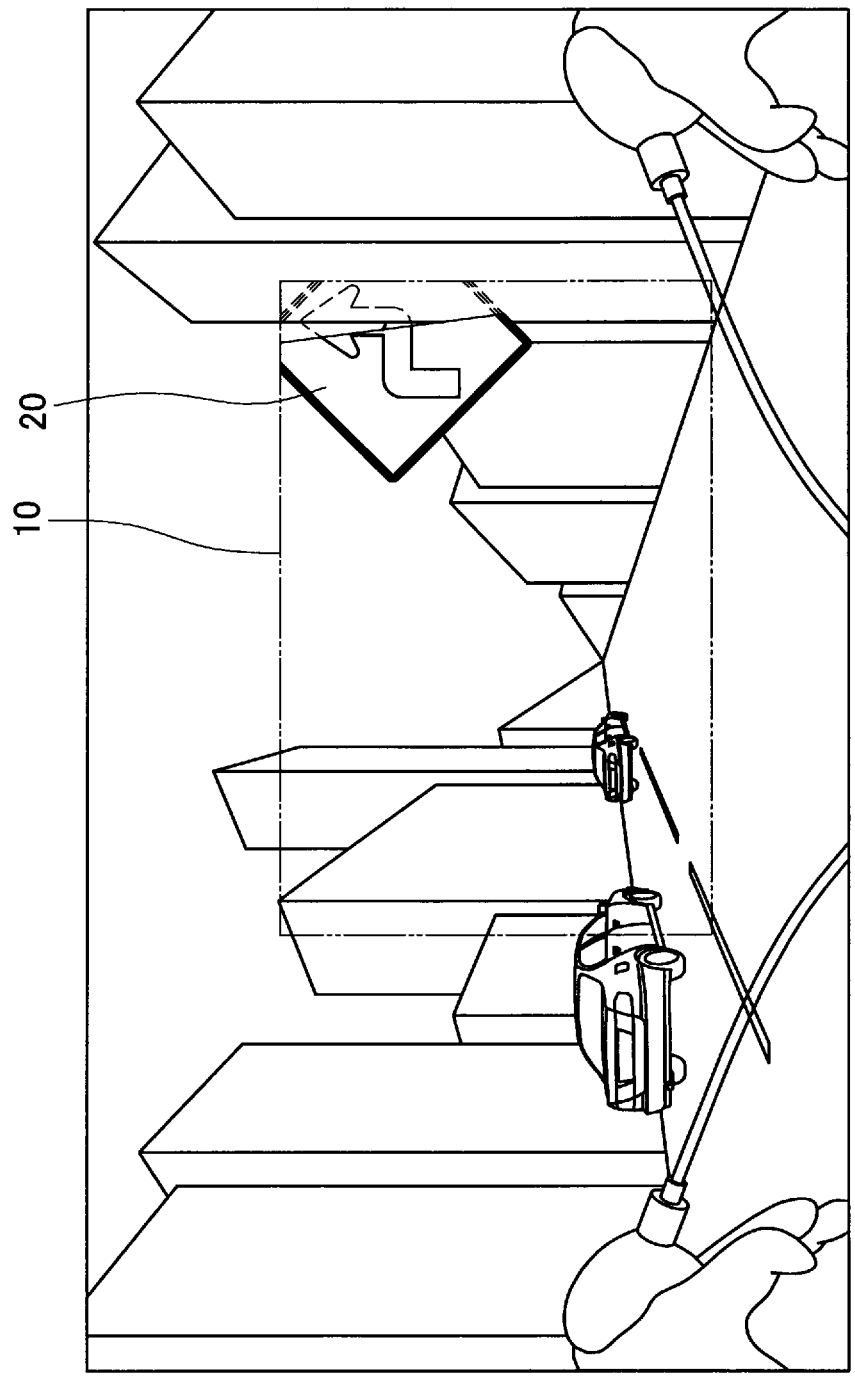
FIG. 2 is a diagram for describing another example of a display in the AR technology.

Note that description will be provided in the following order.
1. Introduction
2. First embodiment (example in which user moves)
2-1. Configuration of device
2-2. Process of device
2-3. Summary of first embodiment
2-4. Modified examples
3. Second embodiment (example in which user rotates)
3-1. Configuration of device
3-2. Process of device
3-3. Summary of second embodiment
4. Third embodiment (example in which virtual object moves)
4-1. Configuration of device
4-2. Process of device
4-3. Summary of third embodiment
5. Hardware configuration of information processing device according to one embodiment of present disclosure
6. Conclusion
1. Introduction First, an AR technology related to an information processing device according to each embodiment of the present disclosure will be described with reference to FIGS. 1 and 2. FIG. 1 is a diagram for describing an example of a display in the AR technology. FIG. 2 is a diagram for describing another example of a display in the AR technology.

A device for the AR technology (which will also be referred to as an AR device) generally has a space processing function and a display function. The space processing function is for performing mapping between a virtual space in which virtual objects are managed and a real space. In addition, the display function is for displaying a virtual object at a position designated in a display area that transmits an outside world image. Thus, the AR device can display a virtual object of a virtual space in accordance with an outside world image that is a real space.

The AR device is, for example, an HMD device, and displays a virtual object 20 so that the virtual object 20 is superimposed on an outside world image in a display area 10 as illustrated in FIG. 1. The AR device moves a display position of the virtual object 20 in accordance with movement of a user wearing the AR device.

Here, a display area of an AR device in which a virtual object is displayed is generally narrower than an outside world image. For example, the display area 10 is a rectangle narrower than the outside world image as illustrated in FIG. 1. For this reason, when the virtual object moves to the outside from the inside of the display area and disappears, the virtual object will disappear from a part of the virtual object coming in the boundary of the display area. For example, parts of the virtual object 20 positioned outside the display area 10 are not displayed and the part of the virtual object 20 positioned within the display area 10 is displayed as illustrated in FIG. 1. In addition, the virtual object 20 gradually disappears in accordance with movement thereof to the outside of the display area 10. Since the parts of the virtual object 20 noted by a user are missed, the user is conscious of the boundary of the display area, and thus a sense of immersion or a sense of reality with respect to the display content may deteriorate.

To cope with this situation, there is a technology of causing a virtual object to fade out as it approaches a boundary of a display area. For example, a transparency of the virtual object 20 increases near the boundary of the display area 10 as the virtual object 20 approaches the boundary of the display area 10 as illustrated in FIG. 2. Then, the virtual object 20 disappears to the outside of the display area 10 while having an increased transparency. In this case, since the virtual object 20 is difficult for the user to visually recognize near the boundary of the display area 10, the user may be hardly conscious of the boundary of the display area 10.

In the technology, however, since the virtual object is not visually recognized near the boundary of the display area, the display area becomes substantially narrower.

Thus, an information processing device 100 that can prevent a sense of immersion of a sense of reality of a user with respect to a virtual object displayed in a display area from deteriorating is provided in each embodiment of the present disclosure. The information processing device will be described in detail below in each embodiment. Note that, for the sake of convenience in description, information processing devices 100 according to first to third embodiments will be distinguished by giving numbers corresponding to the embodiments at the ends thereof, like an information processing device 100-1 to an information processing device 100-3.

2. First Embodiment (Example in which User Moves)

First, the first embodiment of the present disclosure will be described. In the first embodiment, a case in which a displayed virtual object moves as a user moves will be described.

2-1. Configuration of Device

Figure 3:
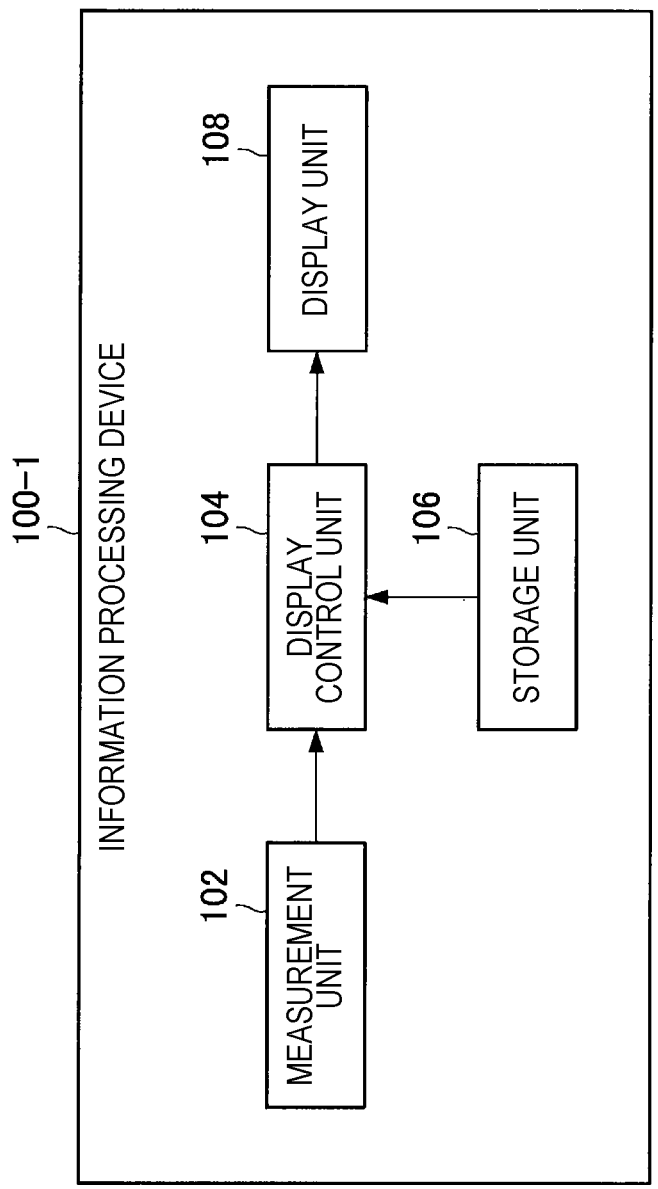
FIG. 3 is a block diagram schematically illustrating an example of a functional configuration of an information processing device according to a first embodiment of the present disclosure.

A functional configuration of the information processing device 100-1 according to the first embodiment of the present disclosure will be described with reference to FIG. 3. FIG. 3 is a block diagram schematically illustrating an example of a functional configuration of the information processing device 100-1 according to the first embodiment of the present disclosure.

As illustrated in FIG. 3, the information processing device 100-1 has a measurement unit 102, a display control unit 104, a storage unit 106, and a display unit 108.

(Measurement Unit)

The measurement unit 102 measures motions of a user and generates measurement information corresponding to sensor information as an acquisition unit. Specifically, the measurement unit 102 measures movement of the user and generates measurement information related to the movement of the user (which will also be referred to as movement measurement information) on the basis of the measurement result. For example, the measurement unit 102 measures displacement or a speed or an acceleration of movement of the user and generates movement measurement information representing the measured displacement or speed or acceleration of the movement. Note that the measurement unit 102 may estimate displacement or a speed or acceleration of movement of the user on the basis of position information obtained from a Global Positioning System (GPS) sensor or the like or image information obtained from a camera sensor.

(Display Control Unit)

The display control unit 104 controls display of the virtual object displayed to be moved in the display area. Specifically, the display control unit 104 controls display of the virtual object in accordance with measurement information. More specifically the display control unit 104 ascertains displacement of the user on the basis of measurement information input from the measurement unit 102. Next, the display control unit 104 changes a position of the virtual object in the virtual space in accordance with the ascertained displacement of the user. Next, the display control unit 104 determines a display position of the virtual object for the user so that the virtual object is present at a position in the real space mapped to the changed position of the virtual object in the virtual space. Then, the display control unit 104 causes the display unit 108 to display the virtual object at the determined display position. For example, the display control unit 104 may perform the above-described process using an existing self-position estimation technology such as simultaneous localization and mapping (SLAM).

Figure 4:
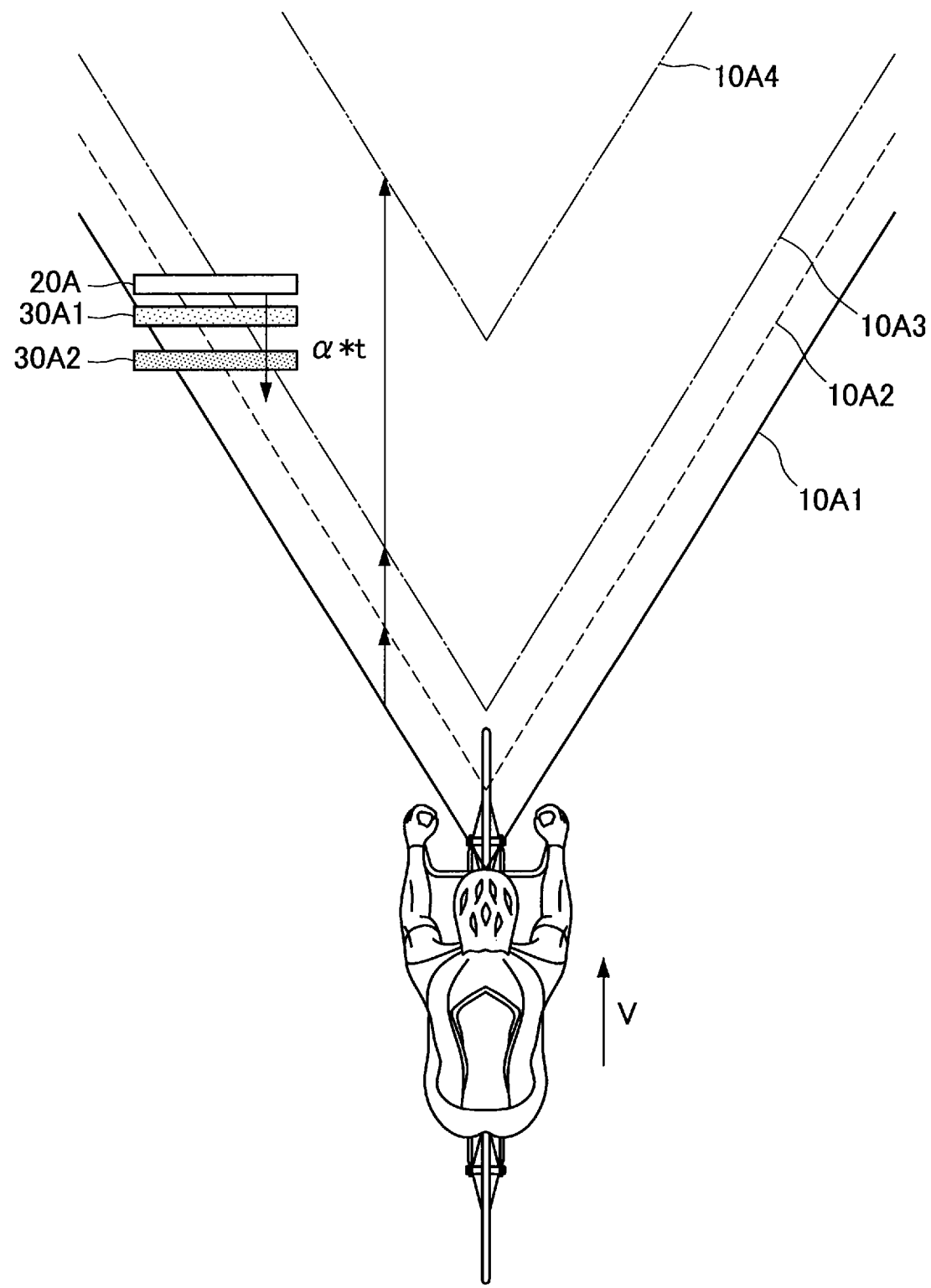
FIG. 4 is a diagram for describing a change example of an aspect of a virtual object according to the embodiment.

In addition, when the virtual object moves across the boundary of the display area, the display control unit 104 changes an aspect of the entire virtual object. Specifically, the display control unit 104 changes the aspect of the virtual object into an aspect different from that in accordance with measurement information. More specifically, the display control unit 104 changes a movement speed of the virtual object while a part of the virtual object is positioned outside the display area. Furthermore, the display control unit 104 changes a movement speed of the virtual object in accordance with movement of the virtual object. For example, the display control unit 104 changes a movement speed of the virtual object by adding another control to the virtual object aspect control in accordance with the measurement information. Further, a display control process according to the present embodiment will be described with reference to FIG. 4. FIG. 4 is a diagram for describing a change example of an aspect of a virtual object according to the present embodiment.

Note that only the added control will be described in the following display control process. The virtual object is displayed, for example, to be fixed in the real space, and an acceleration of the virtual object with respect to a moving user is 0. In addition, unless specified otherwise, the left, right, upward, and downward directions and the like are assumed to be those with reference to the user, and a position of the virtual object is assumed to be a position relative to the user.

First, the display control unit 104 acquires measurement information. For example, the display control unit 104 acquires measurement information representing a movement speed V of the user measured by the measurement unit 102 from the measurement unit 102.

Next, the display control unit 104 determines whether to accelerate the virtual object on the basis of the measurement information. Specifically, the display control unit 104 determines whether the entire virtual object is included in the display area in a next frame of display of the virtual object and after a predetermined period of time elapses. For example, the display control unit 104 may control display of the display unit 108 in units of 60 frames for one second. The display control unit 104 estimates a display time of the next frame, i.e., a position L1 of the virtual object 20A after 1/60 of a second on the basis of the movement speed V of the user represented by movement measurement information and a position L of the virtual object 20A at a current time point. Next, the display control unit 104 determines whether the virtual object 20A protrudes from a view frustum 10A2 at the estimated position L1. Furthermore, the display control unit 104 estimates a position L2 of the virtual object 20A after a predetermined time m elapses. Then, the display control unit 104 determines whether the virtual object 20A completely deviates from a view frustum 10A4 at the estimated position L2.

In a case in which the virtual object is determined to be accelerated, the display control unit 104 sets an acceleration of the virtual object. Specifically, the display control unit 104 determines that at least a part of the virtual object is positioned outside the display area in the next frame, and sets an acceleration of the virtual object if the virtual object is determined to completely deviate from the display area after the predetermined period of time elapses. For example, at least a part of the virtual object 20A is positioned outside the view frustum 10A2 in the next frame, and the entire virtual object 20A completely deviates from the view frustum 10A4 after the predetermined time m elapses as illustrated in FIG. 4. In this case, the display control unit 104 accelerates the virtual object 20A at an acceleration $\alpha$ in the opposite direction to the direction of the speed V represented by the measurement information. That is, the virtual object 20A moves toward the user at a speed $\alpha*t$ (t: time) and then moves to a position 30A1 and then a position 30A2 as illustrated in FIG. 4. Therefore, the virtual object 20 disappears from the view frustums 10 earlier than in a case in which the movement speed of the virtual object 20 does not change, and a time in which the view frustums 10 and the virtual object 20 intersect with each other is shortened.

Note that the acceleration $\alpha$ applied to the virtual object may be a constant or a variable as will be described below. Specifically, the acceleration $\alpha$ is set to a value that reduces a time T from when the virtual object comes in contact with a view frustum to when the entire virtual object moves outside the view frustum. In a case in which the time T is reduced to T/2, for example, the following Expression (1) is established.

[Math. 1]

$$\alpha(T/2)^2 = VT \quad (1)$$

The acceleration α is set to 4v/T using the above Expression (1). Note that, although the example in which the reduced time is T/2 has been described above, the reduced time may be a value varying for each virtual object. In addition, in the case in which the acceleration α is a constant, the acceleration α may be a value varying for each virtual object.

In addition, the predetermined time m is a longer time than a frame interval. For example, the predetermined time m can be a longer time than 1/60 of a second. In addition, the predetermined time m may be set in advance or may be changed afterwards.

(Storage Unit)

Returning to the description of the functional configurations of the information processing device 100-1 with reference to FIG. 3, the storage unit 106 stores information used in processes of the display control unit 104. Specifically, the storage unit 106 stores the virtual object to be displayed on the display unit 108 and positions of the virtual object. For example, the storage unit 106 stores image information, and positions of the virtual object in the virtual space and the display area. Note that, instead of the storage unit 106, an input unit that inputs the information from outside the information processing device 100-1 may be provided.

(Display Unit)

The display unit 108 displays the virtual object on the basis of an instruction of the display control unit 104. Specifically, the display unit 108 displays the virtual object on the basis of a position instructed by the display control unit 104 so that the virtual object designated by the display control unit 104 is superimposed on an outside world image. For example, the display unit 108 may display the virtual object on a screen that transmits the outside world image. In addition, the display unit 108 may superimpose an image on the outside world image reflected on the eyes of the user by projecting image light reflecting the virtual object directly to the eyes of the user.

2-2. Process of Device

Figure 5:
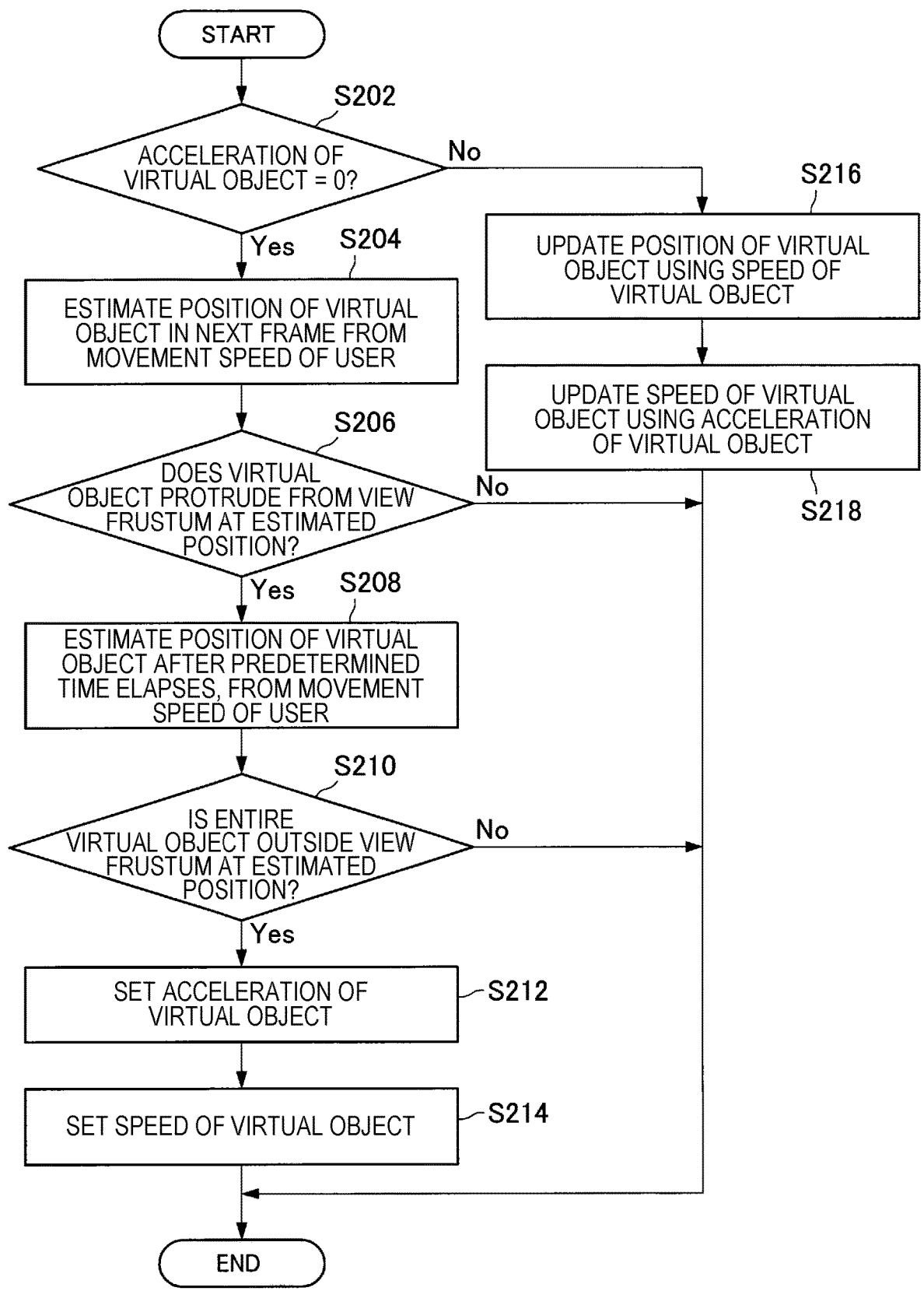
FIG. 5 is a flowchart schematically showing an example of a process of the information processing device according to the embodiment.

Next, a process of the information processing device 100-1 according to the present embodiment will be described with reference to FIG. 5. FIG. 5 is a flowchart schematically showing an example of a process of the information processing device 100-1 according to the present embodiment.

The information processing device 100-1 determines whether an acceleration of the virtual object is 0 (Step S202). Specifically, the display control unit 104 determines whether an acceleration of the virtual object displayed in a display area (view frustum) is 0 in each frame.

When the acceleration of the virtual object is determined to be 0, the information processing device 100-1 estimates a position of the virtual object in the next frame from a user movement speed (Step S204). Specifically, when the acceleration of the virtual object is determined to be 0, the display control unit 104 calculates a user movement speed V from movement measurement information obtained from the measurement unit 102. Next, the display control unit 104 estimates the position L1 of the virtual object in the next frame (e.g., after 1/60 of a second) from the calculated user movement speed V.

Next, the information processing device 100-1 determines whether the virtual object protrudes from the view frustum at the estimated position (Step S206). Specifically, the display control unit 104 determines whether the virtual object protrudes from the view frustum on the basis of the estimated position L1 of the virtual object in the next frame.

When the virtual object is determined to protrude from the view frustum at the estimated position, the information processing device 100-1 estimates a position of the virtual object after a predetermined time elapses from the user movement speed (Step S208). Specifically, when the virtual object is determined to protrude from the view frustum in the next frame, the display control unit 104 estimates the position L2 of the virtual object after the predetermined time elapses from the calculated user movement speed.

Next, the information processing device 100-1 determines whether the entire virtual object is positioned outside the view frustum at the estimated position (Step S210). Specifically, the display control unit 104 determines whether the entire virtual object is positioned outside the view frustum on the basis of the estimated position L2 of the virtual object after the predetermined time elapses.

When the entire virtual object is determined to be positioned outside the view frustum at the estimated position, the information processing device 100-1 sets an acceleration of the virtual object (Step S212). Specifically, when the virtual object is determined to protrude from the view frustum in the next frame and the entire virtual object is determined to be positioned outside the view frustum after the predetermined time elapses, the display control unit 104 sets an acceleration α in the opposite direction to the user movement direction as the acceleration of the virtual object.

Next, the information processing device 100-1 sets a speed of the virtual object (Step S214). Specifically, the display control unit 104 sets a speed u (e.g., $\alpha*(1/60)$) of the virtual object using the set acceleration α of the virtual object.

In addition, when the acceleration of the virtual object is determined not to be 0 in Step S202, the information processing device 100-1 updates the position of the virtual object using the speed of the virtual object (Step S216). Specifically, the display control unit 104 updates the current position L with a position to which the virtual object has moved from the current position L by $u*(1/60)$.

Next, the information processing device 100-1 updates the speed of the virtual object using the acceleration of the virtual object (Step S218). Specifically, the display control unit 104 adds $\alpha*(1/60)$ to the speed u of the virtual object using the set acceleration α of the virtual object.

2-3. Summary of First Embodiment

According to the first embodiment of the present disclosure, the information processing device 100-1 controls display of the virtual object displayed to be moved in the display area and changes an aspect of the virtual object when the virtual object moves across the boundary of the display area as described above. Thus, by changing an aspect of the virtual object into an aspect in which the user does not easily notice the state of the virtual object protruding from the display area, it is possible to prevent the user from being conscious of the boundary of the display area. Therefore, it is possible to suppress deterioration of a sense of immersion or a sense of reality of the user with respect to the virtual object displayed in the display area.

In addition, a change in an aspect of the virtual object includes a change into an aspect different from an aspect corresponding to movement information related to movement of the virtual object. Thus, since display of the virtual object is controlled such that appearances of the virtual object changing due to movement of the user or the virtual object differ, it is possible to make it more difficult for the user to be conscious of the boundary of the display area in a more effective manner. In addition, in a case in which an aspect of the entire virtual object is changed, visibility of the entire virtual object can be improved more than in a case in which an aspect of a part of the virtual object is changed, for example, a case in which a part of the virtual object becomes transparent near the boundary of the display area.

In addition, the virtual object is superimposed on the outside world image, and the display area overlaps a part of the outside world image. Thus, the virtual object can be shown to the user as if the virtual object were present in a real space. Therefore, a sense of reality or a sense of immersion with respect to the display content can be improved.

In addition, the information processing device 100-1 changes an aspect of the virtual object while a part of the virtual object is positioned outside the display area. Thus, even in a case in which it is not possible to avoid protrusion of the virtual object from the display area, it is possible to make it difficult for the user to notice that the virtual object protrudes from the display area.

In addition, a change in an aspect of the virtual object includes a change in a movement speed of the virtual object. Thus, by increasing a movement speed of the virtual object in a state in which the virtual object spans the display area, for example, a time in which the virtual object protrudes from the display area can be shortened. In addition, the boundary of the display area is generally positioned outside the center of the visual field of the user. In addition, it is known that human beings have more difficulty keeping their eyes on an object as a movement speed of the object moving to the outside of their visual fields becomes higher. For this reason, by increasing a movement speed of the virtual object in the state in which the virtual object spans the display area, for example, the user may not be able to keep his or her eyes on the virtual object. Therefore, it is possible to make it difficult for the user to be conscious of the boundary of the display area.

In addition, a degree of a change in an aspect of the virtual object changes in accordance with movement of the virtual object. Thus, as a part of the virtual object protruding from the display area becomes larger, a degree of an aspect, for example, a movement speed of the virtual object, or the like can increase more. In addition, as a degree of protrusion becomes greater, it is considered easier for the user to be conscious of the boundary of the display area. Therefore, according to the present configuration, it is possible to make it more difficult for the user to be conscious of the boundary of the display area by shortening a period in which the degree of protrusion of the virtual object from the display area increases.

In addition, the movement information includes sensor information on a motion of the user. Thus, the virtual object can be moved in accordance exactly with motions of the user without causing the user to be conscious of the boundary of the display area. Therefore, a sense of reality or a sense of immersion with respect to the display content can be improved.

In addition, the sensor information includes information related to movement of the user. Here, a visual field of the user changes in accordance with movement of the user. Thus, there is a possibility of a position of the virtual object corresponding to a real space changing in accordance with the movement of the user as well and the virtual object moving across the boundary of the display area. With regard to this phenomenon, according to the present configuration, it is possible to prevent the user from being conscious of the boundary of the display area in a case in which the user moves.

2-4. Modified Examples

The first embodiment of the present disclosure has been described above. Note that the present embodiment is not limited to the above-described example. First to fourth modified examples of the present embodiment will be described below.

First Modified Example

Figure 6:
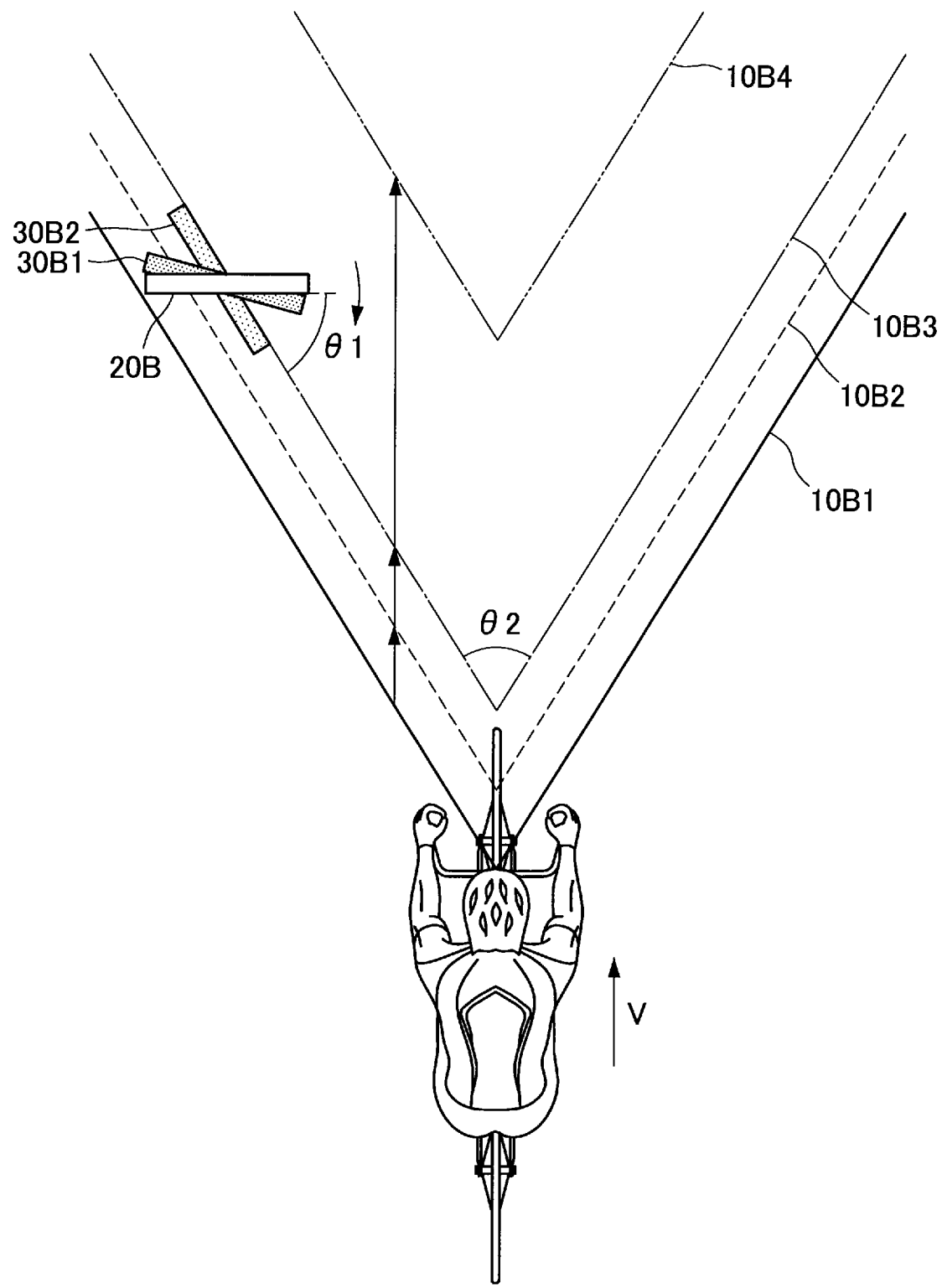
FIG. 6 is a diagram for describing a change example of an aspect of a virtual object according to a first modified example of the embodiment.

As the first modified example of the present embodiment, the information processing device 100-1 may change an attitude of the virtual object, instead of or in addition to changing a movement speed of the virtual object. Specifically, the display control unit 104 changes an attitude of the virtual object while a part of the virtual object is estimated to be positioned outside the display area. Further, a display control process of the present modified example will be described with reference to FIG. 6. FIG. 6 is a diagram for describing a change example of an aspect of a virtual object according to the first modified example of the present embodiment.

The display control unit 104 determines whether to change an attitude of a virtual object on the basis of acquired measurement information. For example, the display control unit 104 estimates a position L1 of a virtual object 20B in a next frame. Next, the display control unit 104 determines whether the virtual object 20B protrudes from a view frustum 10B2 at the position L1 of virtual object 20B. Further, the display control unit 104 estimates a position L2 of the virtual object 20B after a predetermined time m elapses. Then, the display control unit 104 determines whether the virtual object 20B completely deviates from a view frustum 10B4 at the estimated position L2 of the virtual object 20B.

In a case in which the attitude of the virtual object is determined to be changed, the display control unit 104 starts changing the attitude of the virtual object. Specifically, when the display control unit 104 determines that at least a part of the virtual object is positioned outside the display area in the next frame and that the virtual object completely deviates from the display area after a predetermined time elapses, the display control unit rotates the virtual object. It is assumed that, for example, at least a part of the virtual object 20B is positioned outside the view frustum 10B2 in the next frame and that the entire virtual object 20B completely deviates from the view frustum 10B4 after a predetermined time m elapses. In this case, the display control unit 104 rotates the virtual object 20B by a predetermined angle θ1 having a direction orthogonal to a direction of a speed V represented by measurement information on a horizontal plane. In more detail, the display control unit 104 rotates the virtual object 20B so as to have an attitude 30B1 in the next frame and rotates the virtual object until the virtual object finally has an attitude 30B2 with the rotation angle θ1 as illustrated in FIG. 6. Therefore, it is possible to move the virtual object 20 outside the view frustums 10 earlier than a case in which no attitudes of the virtual object 20 are changed.

Note that a rotation of the virtual object is realized by addition of an angular velocity. The value of the added angular velocity may be a constant or a variable as will be described below. Specifically, the angular velocity is set to a value that shortens a time T from when the virtual object comes in contact with a view frustum to when the entire virtual object moves outside the view frustum. In a case in which the time T is shortened to a time T/2, for example, the angular velocity is set to a value at which the object is rotated by θ1 while the time T/2 elapses and the attitude of the virtual object is parallel to a side of a view frustum in proximity to the virtual object. Note that θ1 is calculated with an expression θ1=90°−θ2/2 using a field of view (FOV) θ2 of the view frustum.

In addition, although the example in which the virtual object is rotated clockwise near the left side of the view frustum, i.e., the example in which the virtual object is rotated in the rotation direction being parallel to the side of the view frustum with a small rotation angle, has been described in FIG. 6, the virtual object may be rotated counterclockwise. In this case, the virtual object can be rotated facing the front side of the virtual object with respect to the user. Therefore, an amount of information obtained from the virtual object can be maintained. Note that, in a case in which the virtual object flips over due to rotation, the same information as in the case of the front may be displayed on the back side of the virtual object.

According to the first modified example of the present embodiment as described above, the information processing device 100-1 changes the aspect of the virtual object while a part of the virtual object is estimated to be positioned outside the display area in the aspect corresponding to the movement information. Thus, in the period in which the virtual object protrudes from the display area in the aspect corresponding to the movement information, the aspect of the virtual object can be changed into an aspect in which it is difficult for the virtual object to protrude from the display area. Therefore, it is possible to make it difficult for the user to be conscious of the boundary of the display area. In addition, since it is difficult for the virtual object to protrude, an amount of information representing the virtual object can be maintained.

In addition, a change in an aspect of the virtual object includes a change in an attitude of the virtual object. Thus, the period in which the virtual object protrudes from the display area can be more shortened than in a case in which an attitude of the virtual object is not changed. Furthermore, it is possible to make it more difficult for the virtual object to protrude from a view frustum than in a case in which the virtual object is accelerated. In addition, even if the virtual object starts to protrude from the view frustum, it is possible to make it more difficult for the user to visually recognize the protrusion than in the case in which the virtual object is accelerated.

In addition, the change in the attitude includes a rotation of the virtual object in the direction parallel to the side of the view frustum for the visual field of the user. Thus, in a case in which the user continues to move in the same direction, the time taken for the virtual object to be positioned completely outside the view frustum (the display area) is shortened. Therefore, the time in which the virtual object protrudes from the display area can be shortened, and the boundary of the display area can be less noticed.

Second Modified Example

Figure 7:
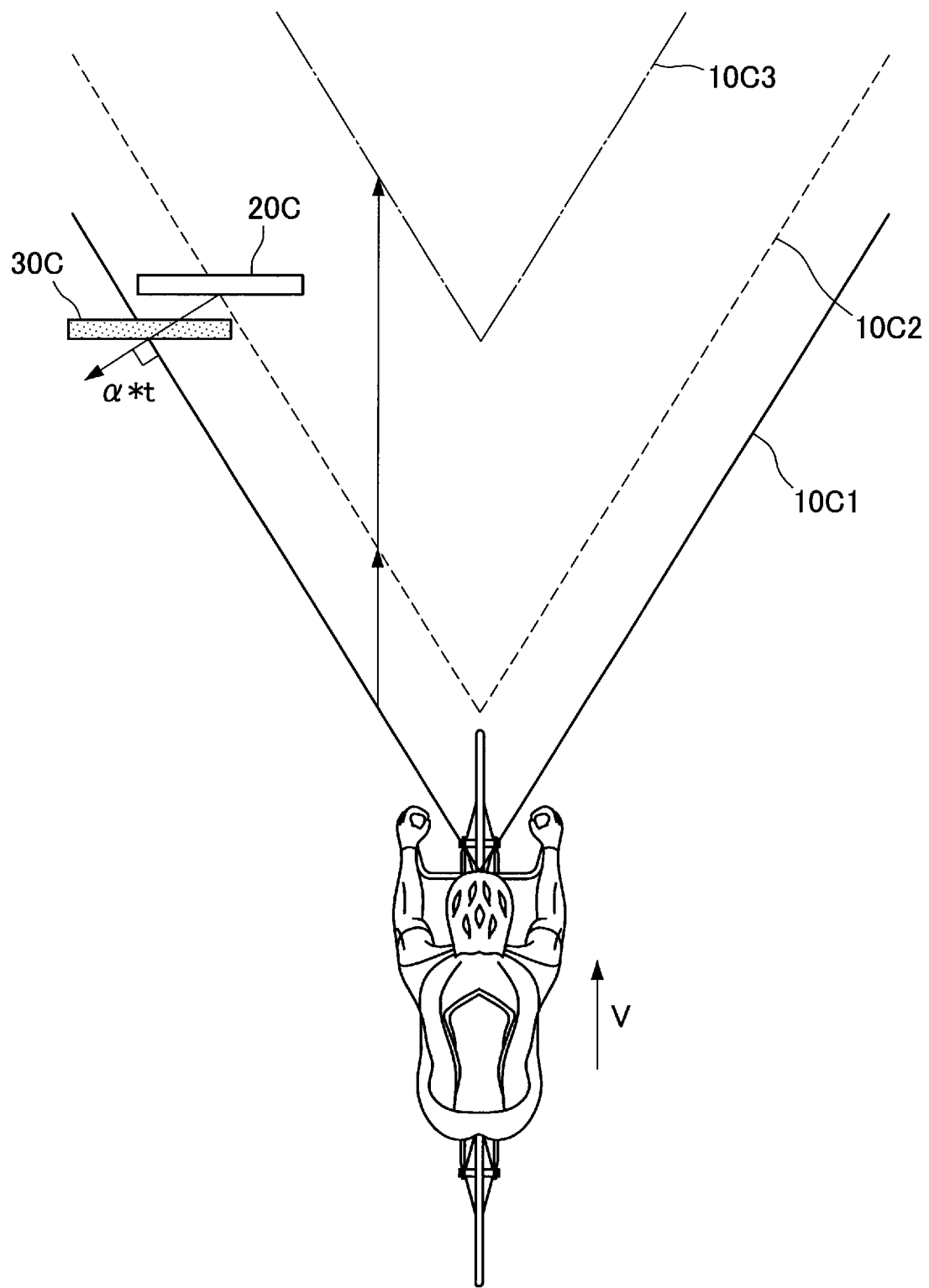
FIG. 7 is a diagram for describing a change example of an aspect of a virtual object according to a second modified example of the embodiment.

As the second modified example of the present embodiment, the information processing device 100-1 may change a movement direction of the virtual object, instead of or in addition to changing a movement speed of the virtual object. Specifically, the display control unit 104 changes a movement direction of the virtual object into a direction perpendicular to a side of a view frustum for the visual field of the user. Further, a display control process of the present modified example will be described with reference to FIG. 7. FIG. 7 is a diagram for describing a change example of an aspect of a virtual object according to the second modified example of the present embodiment.

The display control unit 104 determines whether the virtual object is to be accelerated in a direction different from a movement direction of the user on the basis of acquired measurement information. Note that the determination process is substantially the same as the determination process described in the first modified example.

In the case in which the virtual object is determined to be accelerated in the direction different from the movement direction of the user, the display control unit 104 sets an acceleration of the different direction as the acceleration of the virtual object. Specifically, when at least a part of the virtual object is determined to be positioned outside the display area in the next frame and the virtual object is determined to completely deviate from the display area after the predetermined time m elapses, the display control unit 104 sets an acceleration in a direction perpendicular to a side of a view frustum as the acceleration of the virtual object. For example, the display control unit 104 accelerates a virtual object 20C in a direction perpendicular to a left side of a view frustum 10C1 as illustrated in FIG. 7 and thus the virtual object 20C is moved to a position 30C. Note that an acceleration α is set to a value at which the entire virtual object is moved outside the view frustum 10 after the time T/2 elapses with respect to the above-described time T. Therefore, the virtual object 20 can be moved to the outside of the view frustum 10 earlier than in a case in which the movement aspect of the virtual object 20 is not changed.

As described above, according to the second modified example of the present embodiment, a change in an aspect of the virtual object includes a change in a movement direction of the virtual object. Thus, by moving the virtual object in a direction different from a direction expected by the user, it is possible to make it difficult to keep an eye on the state of the virtual object protruding from the display area. Therefore, it is possible to make it difficult for the user to be conscious of the boundary of the display area.

In addition, the change in the movement direction includes a change in a direction perpendicular to a side of a view frustum for the visual field of the user. Thus, the virtual object can be moved in a direction in which the time taken for the virtual object to disappear from the visual field of the user is predicted to be shorter than in any other direction. Therefore, it is possible to make it more difficult for the user to keep an eye on the state of the visual object protruding from the display area.

Third Modified Example

Figure 8:
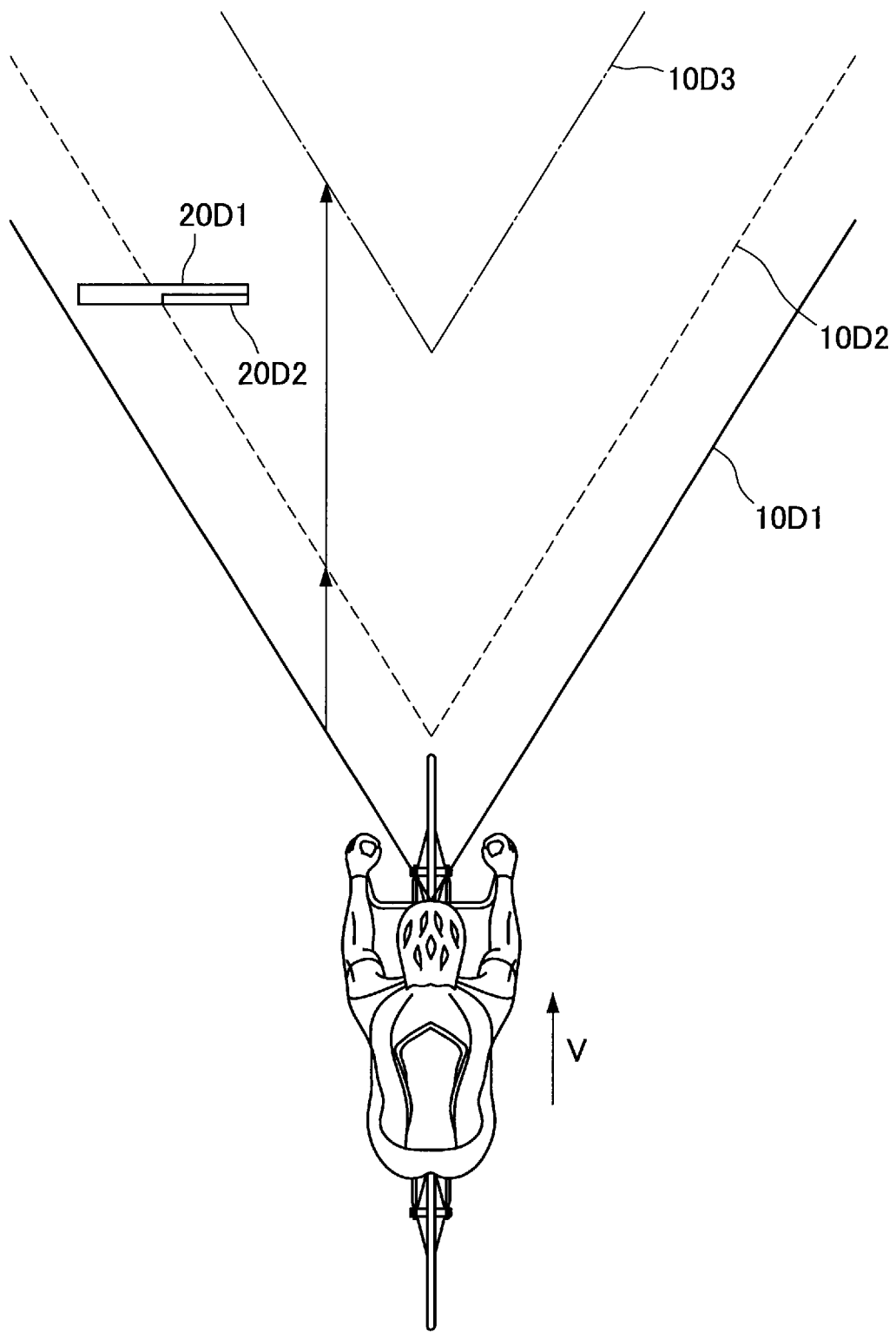
FIG. 8 is a diagram for describing a change example of an aspect of a virtual object according to a third modified example of the embodiment.

As the third modified example of the present embodiment, the information processing device 100-1 may change a size of the virtual object, instead of or in addition to changing a movement speed of the virtual object. Specifically, the display control unit 104 changes a size of the virtual object into a predetermined size. Further, a display control process of the present modified example will be described with reference to FIG. 8. FIG. 8 is a diagram for describing a change example of an aspect of the virtual object according to the third modified example of the present embodiment.

The display control unit 104 determines whether to change a size of the virtual object on the basis of acquired measurement information. Note that the determination process is substantially the same as the determination process described in the first modified example.

In a case in which a size of the virtual object is determined to be changed, the display control unit 104 starts changing the size of the virtual object into a predetermined size. Specifically, when the display control unit 104 determines that at least a part of the virtual object will be positioned outside the display area in the next frame and that the virtual object will completely deviate from the display area after a predetermined time elapses, the display control unit 104 starts reducing the size of the virtual object so that the virtual object is included in a view frustum. For example, the display control unit 104 gradually reduces a size of a virtual object from a size of a virtual object 20D1 to a size of a virtual object 20D2 in accordance with a change in a position L of the virtual object 20D1. The size of the virtual object 20 is changed by ½ times for each frame. Then, when the size of the virtual object 20 becomes equal to or smaller than a predetermined size, the display control unit 104 erases the virtual object 20. Therefore, it is possible to prevent the virtual object 20 from protruding from the view frustum 10.

Note that, although the example in which the size of the virtual object is changed by ½ times for each frame has been described above, the size may be changed into a predetermined size for each frame after the time T/2 elapses with respect to the above-described time T. In addition, changing the size may be changing the scale.

In addition, the display control unit 104 may change a transparency of the virtual object, instead of or in addition to changing a size of the virtual object. For example, the display control unit 104 improves a transparency of the virtual object 20 by lowering an alpha value in accordance with a change in the position L of the virtual object caused by movement of the user. Then, when the transparency of the virtual object 20 becomes equal to or lower than a predetermined transparency, the display control unit 104 erases the virtual object 20. Note that the display control unit 104 may continue the transparency processing until the virtual object 20 becomes completely transparent.

As described above, according to the third modified example of the present embodiment, a change in an aspect of the virtual object includes a change in a size of the virtual object. Thus, by changing the size of the virtual object in accordance with a change of the display area, it is possible to prevent the virtual object from protruding from the display area. Therefore, it is possible to reduce concern of the user being conscious of the boundary of the display area.

In addition, a change in an aspect of the virtual object includes a change in a transparency of the virtual object. Thus, by lowering visibility of the virtual object, it is possible to make it difficult for the user to notice the virtual object protruding from the display area. Therefore, it is possible to reduce concern of the user being conscious of the boundary of the display area.

Fourth Modified Example

As the fourth modified example of the present embodiment, the information processing device 100-1 may give a visual effect to a virtual object while changing an aspect of the virtual object. Specifically, the display control unit 104 changes a contrast between the virtual object and the display area in accordance with the change in the aspect of the virtual object. For example, the display control unit 104 lowers the contrast between the virtual object and the display area in each frame. Note that the display control unit 104 may change a contrast between the virtual object and the outside world image.

In addition, the display control unit 104 changes brightness of the virtual object in accordance with a change in an aspect of the virtual object. For example, the display control unit 104 lowers brightness or luminance of the virtual object in each frame. Note that peripheral brightness of the virtual object as well as brightness of the virtual object may be changed.

In addition, the display control unit 104 may make the virtual object blurry in accordance with a change in an aspect of the virtual object. For example, the display control unit 104 strengthens the degree of blur (blur) applied to the virtual object in each frame.

Note that the visual effect may be given to the entire virtual object or to only a part of the virtual object.

As described above, according to the fourth modified example of the present embodiment, the information processing device 100-1 gives a visual effect to the virtual object while changing an aspect of the virtual object. Thus, visibility of the virtual object positioned near the boundary of the display area can be lowered. Therefore, it is possible to make it difficult to be conscious of the boundary of the display area.

In addition, the visual effect includes a change in a contrast between the virtual object and the display area. Thus, by lowering the contrast with the display area in which the virtual object is displayed, it is possible to lower visibility of the user with respect to the virtual object while suppressing a sense of incompatibility of the user.

In addition, the visual effect includes a change in brightness of the virtual object. Thus, by changing brightness of the virtual object in accordance with brightness around the user, it is possible to lower visibility of the user with respect to the virtual object while suppressing a sense of incompatibility of the user.

In addition, the visual effect includes blurring. Thus, by making the contour of the virtual object vague, it is possible to make it difficult to recognize whether the virtual object is protruding from the display area.

3. Second Embodiment (Example in which User Rotates)

The first embodiment of the present disclosure has been described above. Next, a second embodiment of the present disclosure will be described. In the second embodiment, a case in which a displayed virtual object moves as a user rotates will be described.

3-1. Configuration of Device

First, a functional configuration of an information processing device 100-2 according to the second embodiment of the present disclosure will be described. Note that structural elements thereof are substantially the same as those of the information processing device 100-1 according to the first embodiment. Only differences from the first embodiment will be described below.

(Measurement Unit)

A measurement unit 102 performs measurement related to rotation of a user and generates measurement information related to rotation of the user (which will also be referred to as rotation measurement information below) on the basis of the measurement result. For example, the measurement unit 102 measures a rotation angle, an angular velocity, or an angular acceleration of the head of the user wearing the information processing device 100-2 and generates rotation measurement information representing the measured rotation angle, angular velocity, or angular acceleration. Note that the rotation of the user may be rotation of his or her body in addition to rotation of only his or her head.

(Display Control Unit)

A display control unit 104 controls display of a virtual object in accordance with rotation measurement information. Specifically, the display control unit 104 estimates a visual field of a user on the basis of rotation measurement information and determines a range of a virtual space corresponding to the range of the estimated visual field. Then, the display control unit 104 causes a display unit 108 to display the virtual object included in the determined range of the virtual space.

Figure 9:
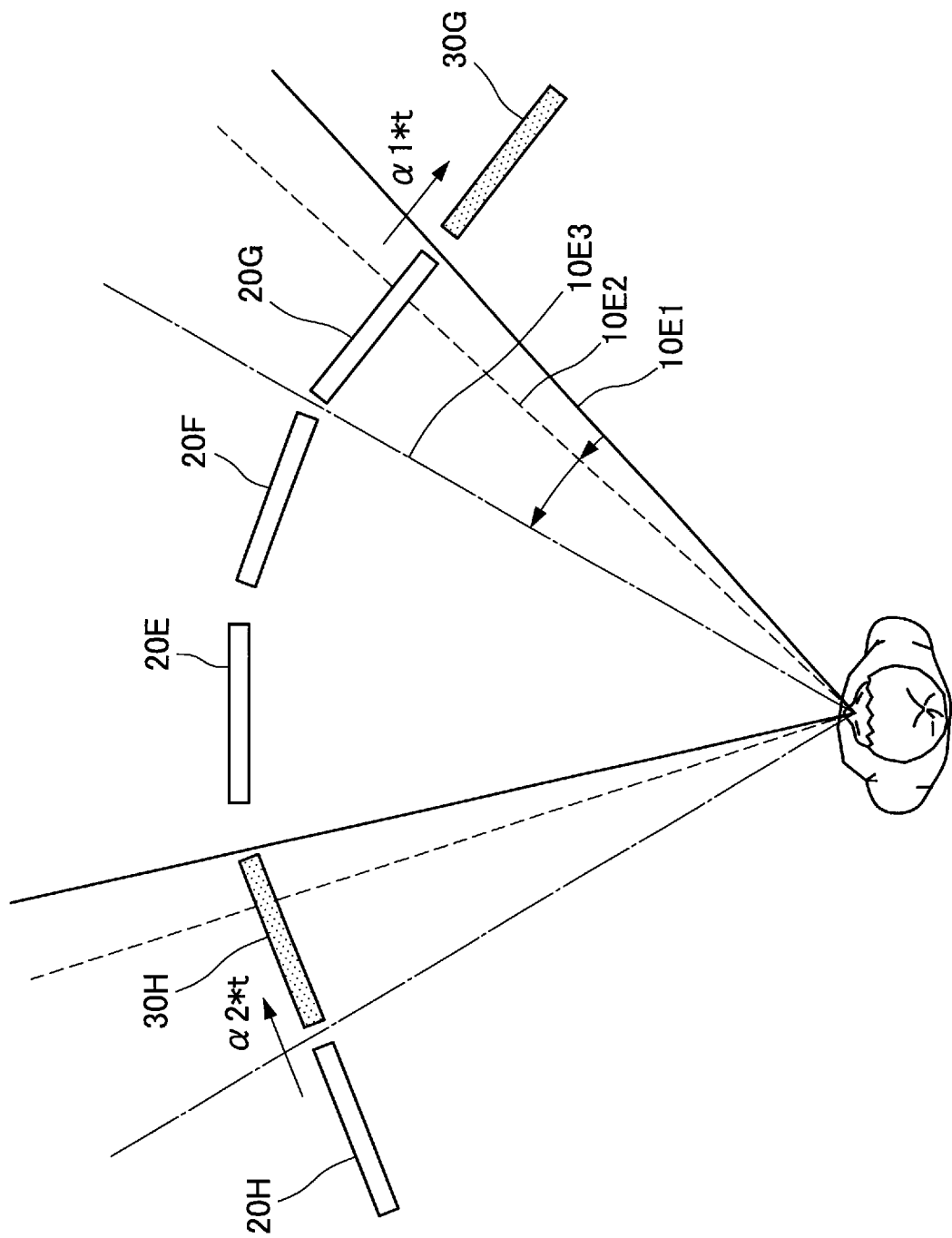
FIG. 9 is a diagram for describing a change example of an aspect of a virtual object according to a second embodiment of the present disclosure.

In addition, when the virtual object moves across a boundary of a display area, the display control unit 104 changes an aspect of the entire virtual object into an aspect different from an aspect corresponding to the rotation measurement information. Specifically, when the virtual object is moved from the inside to the outside of the display area or the virtual object is moved from outside to inside the display area, the display control unit 104 changes a movement speed of the virtual object. Further, a display control process according to the present embodiment will be described with reference to FIG. 9. FIG. 9 is a diagram for describing a change example of an aspect of a virtual object according to the present embodiment.

First, a case in which the virtual object is moved from the inside to the outside of a display area will be described.

First, the display control unit 104 causes the virtual object to be displayed in the display area of the display unit 108. For example, the display control unit 104 causes the display unit 108 to display virtual objects 20E, 20F, and 20G in a view frustum 10E1 for a visual field of a user. A virtual object 20H is not displayed because it is not included in the view frustum 10E1. Note that each of the displayed virtual objects 20 is disposed to surround the user facing the front side of the user. Description will be provided below focusing on the virtual object 20G.

Next, the display control unit 104 determines whether the virtual object protrudes from the display area on the basis of acquired rotation measurement information. For example, when the user rotates his or her head counterclockwise, the display control unit 104 estimates a position of the virtual object 20G in the next frame on the basis of rotation measurement information acquired from the measurement unit 102. Then, the display control unit 104 determines whether the virtual object 20G protrudes from the view frustum 10 in the next frame.

When the virtual object is determined to protrude from the display area, the display control unit 104 accelerates the virtual object toward the outside of the display area. For example, since the virtual object 20G protrudes from a view frustum 10E2 in the next frame, the display control unit 104 moves the virtual object 20G to a position 30G outside the view frustum 10E2 at an acceleration of $\alpha 1$. As a result, the virtual object 20G can be shown to the user as if the virtual object were flicked out from the view frustum 10, i.e., the display area 10.

Subsequently, a case in which the virtual object is moved from outside to inside the display area will be described.

The display control unit 104 determines whether an unshown virtual object can be displayed in the display area on the basis of acquired rotation measurement information. For example, when the user rotates his or her head counterclockwise, the display control unit 104 estimates a position of the virtual object 20H in the next frame on the basis of rotation measurement information acquired from the measurement unit 102. Then, the display control unit 104 determines whether the entire virtual object 20H is displayed within the view frustum 10 in the next frame.

When it is determined that the unshown virtual object can be displayed in the display area, the display control unit 104 accelerates the unshown virtual object toward inside the display area. For example, since a part of the virtual object 20H3 protrudes from the view frustum 10E2 in the next frame, the display control unit 104 does not cause the virtual object 20H to be displayed. However, since the entire virtual object 20H3 comes within a view frustum 10E3 in the following frame, the display control unit 104 moves the virtual object 20H1 to a position 30H inside the view frustum 10 at an acceleration of $\alpha 2$. As a result, the virtual object 20H can be shown to the user as if the virtual object jumps into the view frustum 10.

Note that accelerations to be set in the case in which the virtual object is moved from the inside to the outside of the display area and the case in which the virtual object is moved from the outside to the inside of the display area may be the same as or different from each other.

3-2. Process of Device

Figure 10:
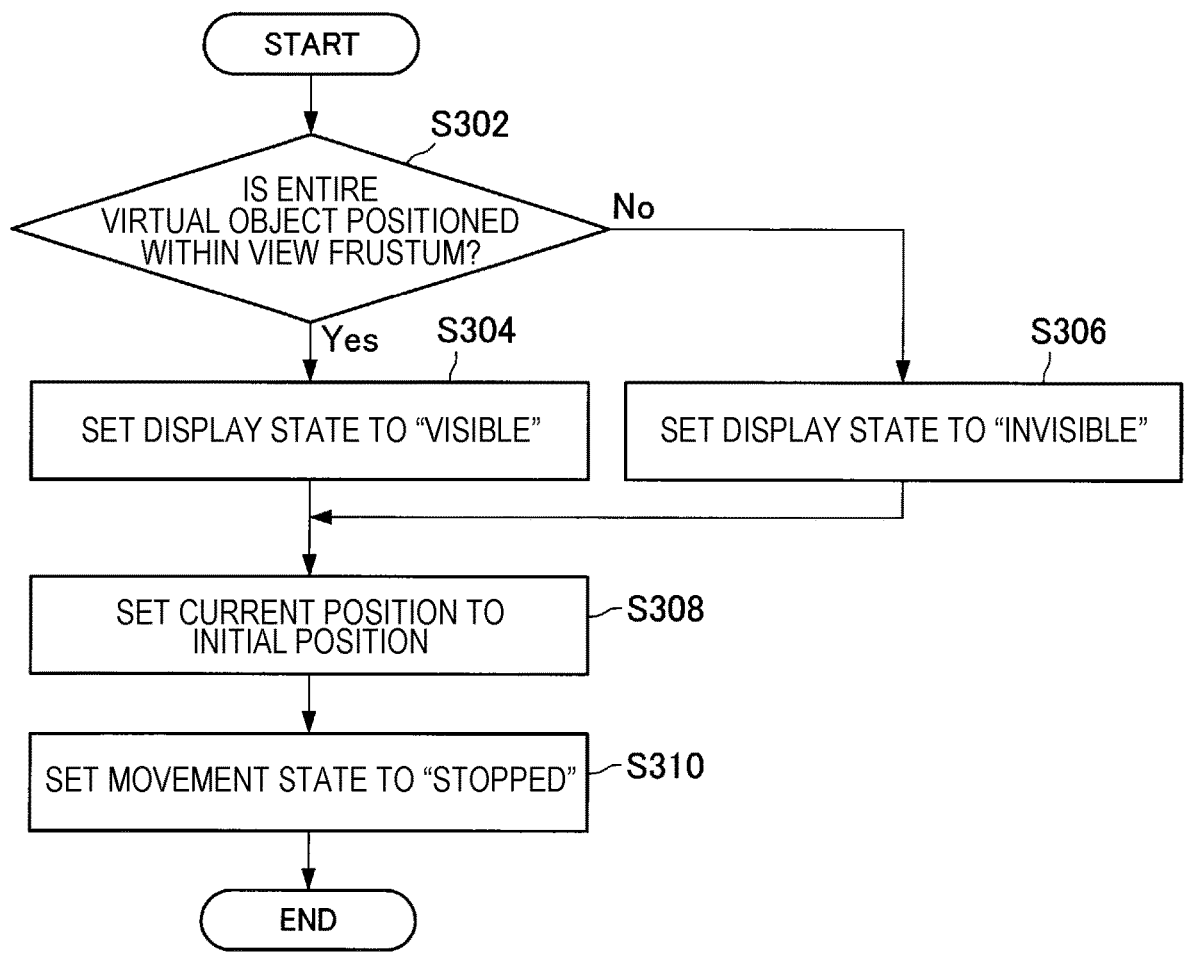
FIG. 10 is a flowchart conceptually showing an example of an initialization process of an information processing device according to the embodiment.

Next, a process of the information processing device 100-2 according to the present embodiment will be described. First, an initialization process of the information processing device 100-2 will be described with reference to FIG. 10. FIG. 10 is a flowchart conceptually showing an example of the initialization process of the information processing device 100-2 according to the present embodiment. Note that the virtual object has attributes including a display state, a movement state, an initial position L0, a current position L, a display start position LS, a movement destination position LG, an orientation, a width w, a speed u, and an acceleration $\alpha$.

The information processing device 100-2 determines whether an entire virtual object is positioned within a view frustum (Step S302). Specifically, the display control unit 104 determines whether each of virtual objects is completely included in a view frustum for each of the virtual objects to be displayed.

When the entire virtual object is determined to be positioned within the view frustum, the information processing device 100-2 sets a display state to "visible" (Step S304), and otherwise sets the display state to "invisible" (Step S306). Specifically, in the case in which the entire virtual object is completely included in the view frustum, the display control unit 104 sets the display state of the virtual object to "visible." In addition, in a case in which a part or all of the virtual object is positioned outside the view frustum, the display control unit 104 sets the display state of the virtual object to "invisible."

Next, the information processing device 100-2 sets the current position as an initial position (Step S308). Specifically, the display control unit 104 sets the current position L of the virtual object as the initial position L0 for each of the virtual objects.

Next, the information processing device 100-2 sets the movement state to "stopped" (Step S310). Specifically, the display control unit 104 sets the movement state of the virtual object to "stopped" for each of the virtual objects.

Note that the initialization process is performed with respect to the other attributes of the virtual object. For example, a speed and an acceleration of the virtual object are set to 0.

Figure 11:
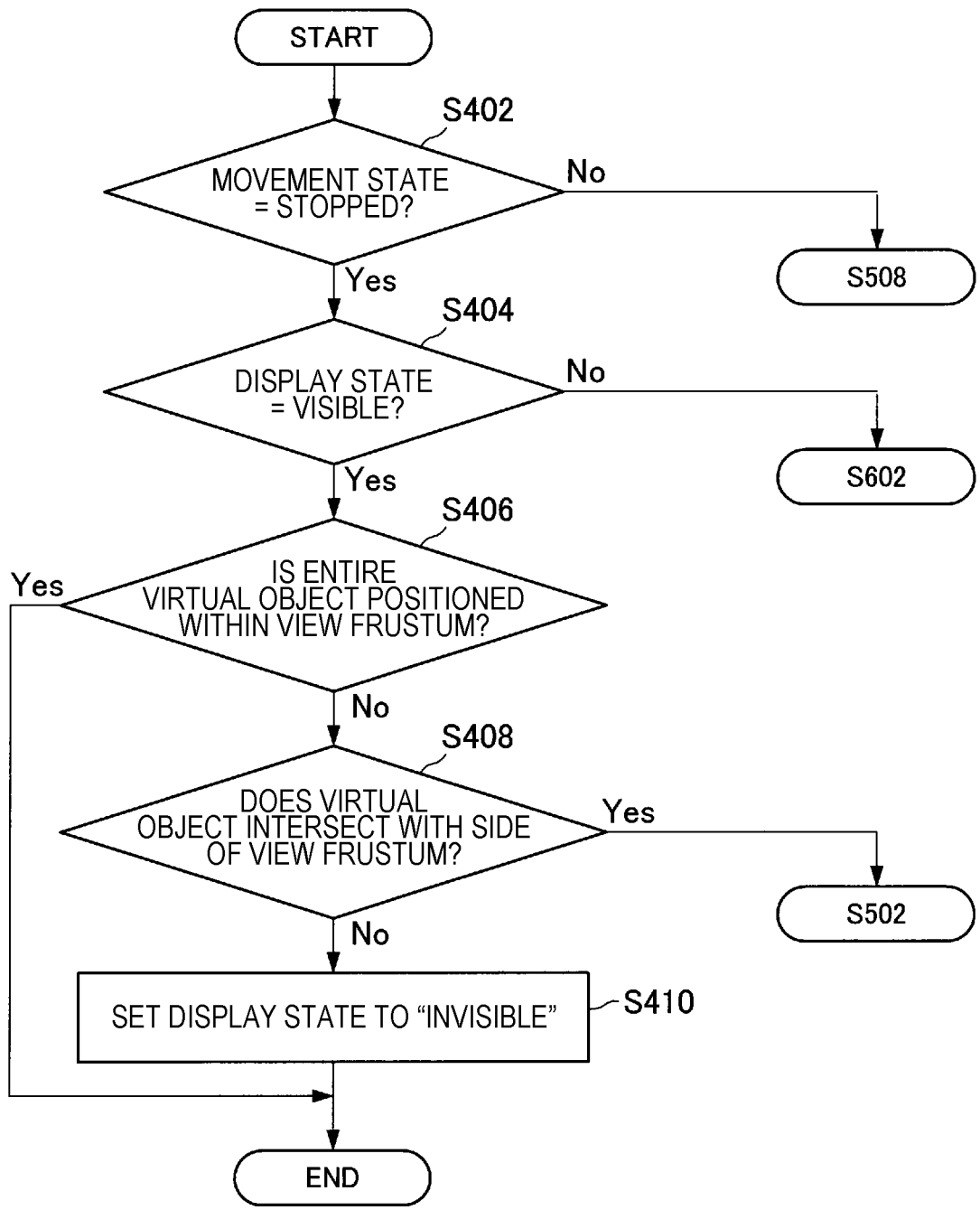
FIG. 11 is a flowchart conceptually showing an example of a display control process of the information processing device according to the embodiment.
Figure 12:
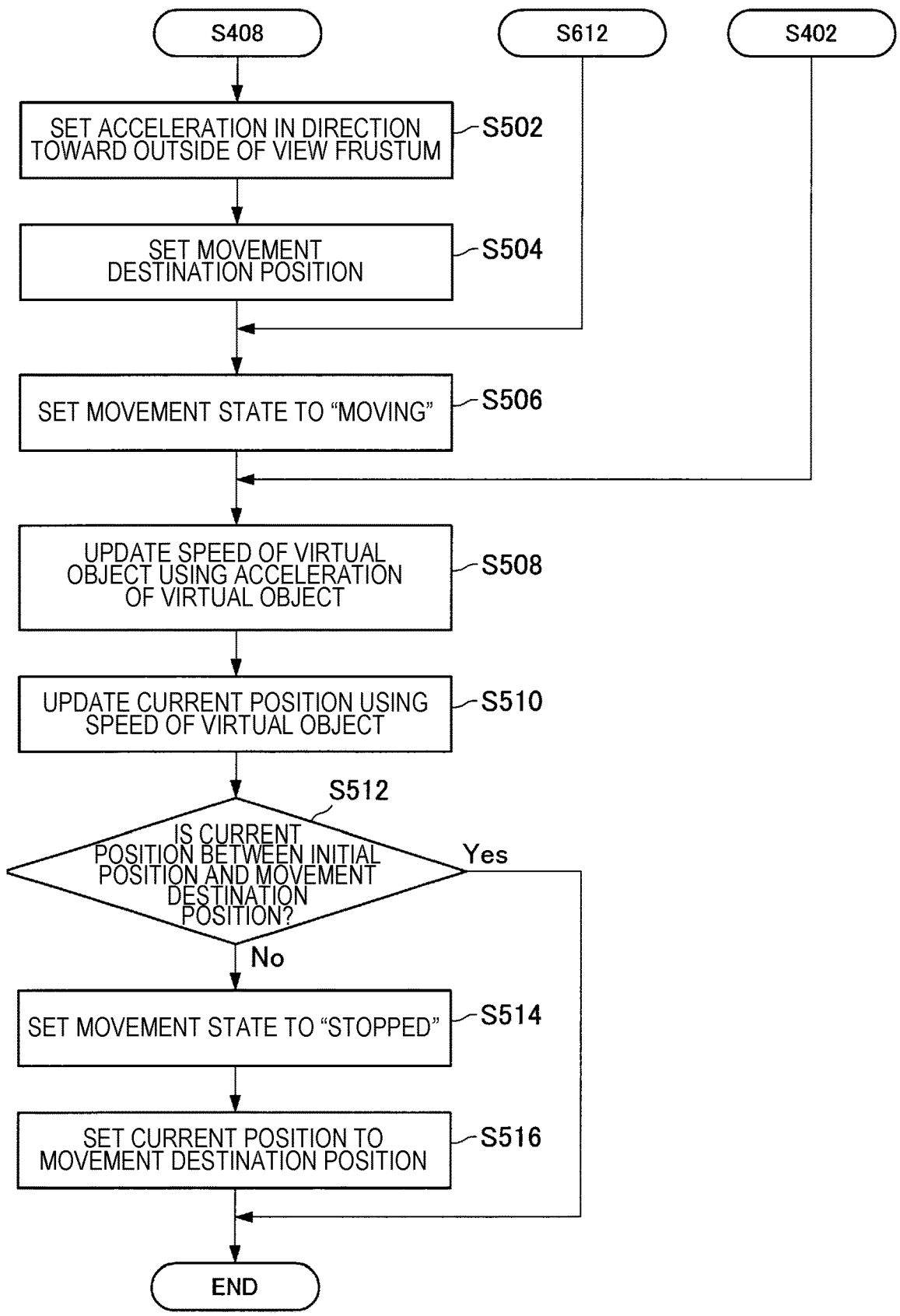
FIG. 12 is a flowchart conceptually showing an example of a display control process of the information processing device according to the embodiment.
Figure 13:
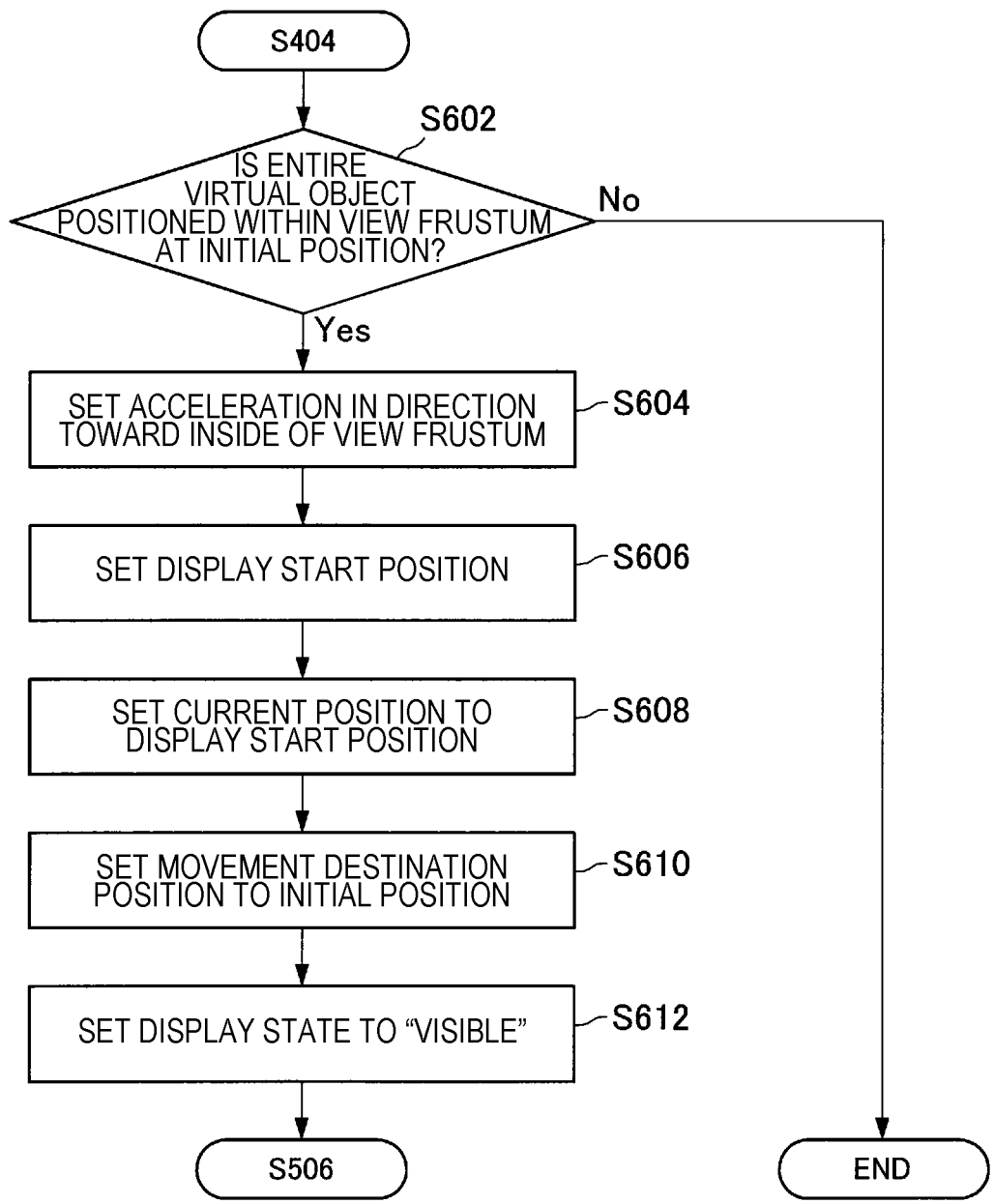
FIG. 13 is a flowchart conceptually showing an example of a display control process of the information processing device according to the embodiment.

Subsequently, a display control process of the information processing device 100-2 will be described with reference to FIGS. 11 to 13. FIGS. 11 to 13 are flowcharts conceptually showing an example of the display control process of the information processing device 100-2 according to the present embodiment. Note that the following process is performed, for example, for each frame (every 1/60 of a second).

First, referring to FIG. 11, the information processing device 100-2 determines whether a movement state is "stopped" (Step S402). Specifically, the display control unit 104 determines whether the movement state of the virtual object is "stopped." Note that, since the movement states of all the virtual objects are "stopped" immediately after the initialization process, the process proceeds to Step S404.

In a case in which the movement state is "moving," the process proceeds to Step S508 of FIG. 12. Details thereof will be described below.

When it is determined that the movement state is "stopped," the information processing device 100-2 determines whether the display state is "visible" (Step S404). Specifically, when it is determined that the movement state of the virtual object is "stopped," the display control unit 104 determines whether the display state of the virtual object is "visible."

In the case in which the display state is "invisible," the process proceeds to Step S602 of FIG. 13. Details thereof will be described below.

When it is determined that the display state is "visible," the information processing device 100-2 determines whether the entire virtual object is positioned within a view frustum (Step S406). Specifically, the display control unit 104 determines whether the entire virtual object of which the display state is "visible" is positioned within the view frustum in the corresponding frame.

When a part or all of the virtual object is determined to be outside the view frustum, the information processing device 100-2 determines whether the virtual object intersects with a side of the view frustum (Step S408). Specifically, when a part or all of the virtual object is determined to be outside the view frustum, the display control unit 104 determines whether the virtual object intersects with a left side or a right side of the view frustum.

When the virtual object is determined to intersect with a side of the view frustum, the process proceeds to Step S502 of FIG. 12. Details thereof will be described below.

When the virtual object is determined not to intersect with a side of the view frustum, the information processing device 100-2 sets the display state of the virtual object to "invisible" (Step S410). Specifically, in the case in which the entire virtual object is positioned outside the view frustum, the display control unit 104 sets the display state of the virtual object to "invisible."

Note that, in the case in which the entire the virtual object is determined to be positioned within the view frustum in Step S406, the information processing device 100-2 ends the process.

Subsequently, referring to FIG. 12, when the virtual object is determined to intersect with the side of the view frustum in Step S408, the information processing device 100-2 sets an acceleration in a direction toward the outside of the view frustum (Step S502). Specifically, in the case in which the virtual object is determined to intersect with the left side of the view frustum, the display control unit 104 sets an acceleration α in the left direction as the acceleration of the virtual object. In addition, in the case in which the virtual object is determined to intersect with the right side of the view frustum, the display control unit 104 sets the acceleration α in the right direction as the acceleration of the virtual object.

Next, the information processing device 100-2 sets a movement destination position of the virtual object (Step S504). Specifically, in the case in which the virtual object is determined to intersect with the left side of the view frustum, the display control unit 104 sets the movement destination position LG of the virtual object to a position away from the current position L by a distance corresponding to the width w in the left direction. In addition, in the case in which the virtual object is determined to intersect with the right side of the view frustum, the display control unit 104 sets the movement destination position LG of the virtual object to a position away from the current position L by the distance corresponding to the width w in the right direction.

Next, the information processing device 100-2 sets the movement state to "moving." Specifically, the display control unit 104 sets the movement state of the virtual object to "moving." Note that the process may proceed to this step from Step S612 which will be described below.

Next, the information processing device 100-2 updates the speed of the virtual object using the acceleration of the virtual object (Step S508). Specifically, the display control unit 104 updates the speed u of the virtual object to a speed (u+α*(1/60)) using the acceleration α of the virtual object.

Next, the information processing device 100-2 updates the current position using the speed of the virtual object (Step S510). Specifically, the display control unit 104 updates the current position L to a position to which movement is performed from the current position L by u*(1/60).

Next, the information processing device 100-2 determines whether the current position is between the initial position and the movement destination position (Step S512). Specifically, the display control unit 104 determines whether the current position L of the virtual object is on a line segment connecting the initial position L0 and the movement destination position LG (without including end points). In other words, the display control unit 104 determines whether movement of the virtual object has been completed.

When the current position is determined not to be between the initial position and the movement destination position, the information processing device 100-2 sets the movement state to "stopped" (Step S514). Specifically, when the current position L of the virtual object is determined not to be on the line segment, the display control unit 104 sets the movement state of the virtual object to "stopped." The reason for this is that the movement of the virtual object has been completed.

In addition, the information processing device 100-2 sets the current position to the movement destination position (Step S516). Specifically, when the current position L of the virtual object is determined not to be on the line segment, the display control unit 104 sets the current position L of the virtual object to the movement destination position LG. The reason for this is that there is a case in which the virtual object passes the target movement destination position LG, and in that case, the position of the virtual object should be corrected.

Note that, when the current position is determined to be between the initial position and the movement destination position in Step S512, the information processing device 100-2 ends the process. The reason for this is that the virtual object is still moving.

Subsequently, referring to FIG. 13, when the display state is determined to be "invisible" in Step S404, the information processing device 100-2 determines whether the entire virtual object is positioned within the view frustum at the initial position (Step S602). Specifically, the display control unit 104 determines whether the entire virtual object is positioned within the view frustum at the initial position L0 of the virtual object of which the display state is "invisible."

When the entire virtual object is determined to be positioned in the view frustum at the initial position, the information processing device 100-2 sets an acceleration in the direction toward the inside of the view frustum (Step S604). Specifically, when the entire virtual object is determined to be positioned within the view frustum at the initial position L0, the display control unit 104 sets the acceleration α in the right direction in a case in which the initial position L0 of the virtual object is close to the left side of the view frustum. In addition, in a case in which the initial position L0 of the virtual object is close to the right side of the view frustum, the display control unit 104 sets the acceleration α in the left direction.

Next, the information processing device 100-2 sets a display start position (Step S606). Specifically, in the case in which the initial position L0 of the virtual object is close to the left side of the view frustum, the display control unit 104 sets the display start position LS to a position moved from the initial position L0 by a distance corresponding to the width w in the left direction. In addition, in the case in which the initial position L0 of the virtual object is close to the right side of the view frustum, the display control unit 104 sets the display start position LS to a position moved from the initial position L0 by the distance corresponding to the width w in the right direction. The reason for this is to shorten the period in which the virtual object protrudes from the view frustum when the virtual object moves from outside to inside the view frustum.

Next, the information processing device 100-2 sets the current position to the display start position (Step S608). Specifically, the display control unit 104 sets the current position L of the virtual object to the set display start position LS.

Next, the information processing device 100-2 sets the movement destination position to the initial position (Step S610). Specifically, the display control unit 104 sets the movement destination position LG of the virtual object to the initial position L0.

Next, the information processing device 100-2 sets the display state to "visible" (Step S612). Specifically, the display control unit 104 sets the display state of the virtual object to "visible."

After the execution of Step S612, the process proceeds to the above-described Step S506, and movement of the virtual object starts.

Note that, when a part or all of the virtual object is determined to be outside the view frustum at the initial position in Step S602, the information processing device 100-2 ends the process. The reason for this is that, in the corresponding frame, an area sufficient for displaying the virtual object is not secured.

3-3. Summary of Second Embodiment

As described above, according to the second embodiment of the present disclosure, the information processing device 100-2 changes an aspect of the entire virtual object into an aspect different from an aspect corresponding to information related to rotation of the user when the virtual object moves across the boundary of the display area. Here, even in a case in which the user does not move, the visual field of the user changes in accordance with rotation of the user. Thus, there is a possibility of a position of the virtual object corresponding to a real space changing in accordance with the rotation of the user and the virtual object moving across the boundary of the display area. With regard to this phenomenon, according to the present configuration, it is possible to prevent the user from being conscious of the boundary of the display area in the case in which the user rotates.

In addition, in the case in which the virtual object moves from outside to inside the display area, the information processing device 100-2 causes the virtual object not to be displayed in the display area until an area in which the entire virtual object is to be displayed is secured. Thus, it is possible to prevent the virtual object from being continuously displayed in a state in which the virtual object protrudes from the display area. Therefore, it is possible to prevent the user from being conscious of the boundary of the display area.

4. Third Embodiment (Example in which Virtual Object Moves)

The second embodiment of the present disclosure has been described above. Next, a third embodiment of the present disclosure will be described. In the third embodiment, a case in which a displayed virtual object moves as the virtual object move in a virtual space mapped to a real space while a user remains stationary will be described.

4-1. Configuration of Device

First, a functional configuration of an information processing device 100-3 according to the third embodiment of the present disclosure will be described. Note that structural elements are substantially the same as those of the information processing device 100-1 according to the first embodiment. Only differences from the first and second embodiments will be described below.

(Display Control Unit)

The display control unit 104 controls display of a virtual object in accordance with movement information in a virtual space of the virtual object (which will also be referred to as virtual movement information below). Specifically, the display control unit 104 determines a position of the virtual object in the virtual space on the basis of the virtual movement information and determines a display position of the virtual object so that the virtual object is present at a position in a real space mapped to the determined position in the virtual space. Then, the display control unit 104 causes the display unit 108 to display the virtual object at the determined position.

Figure 14:
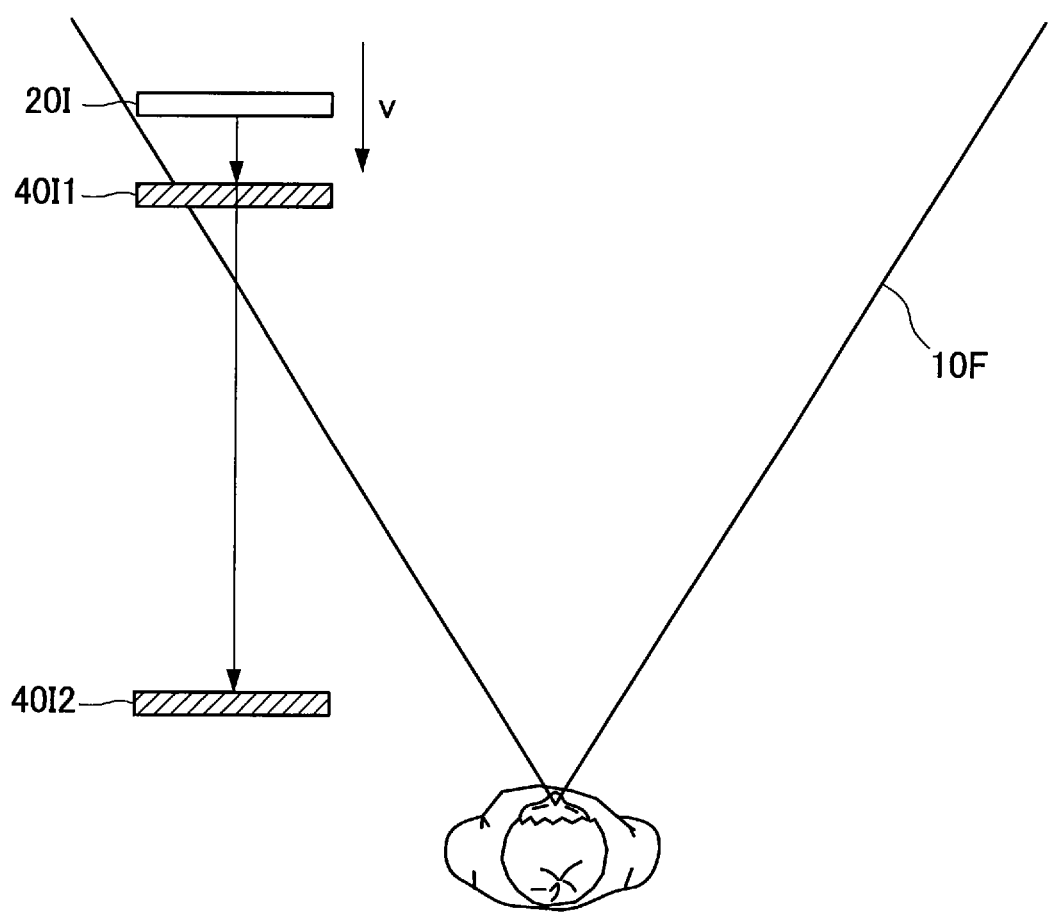
FIG. 14 is a diagram for describing a change example of an aspect of a virtual object according to a third embodiment of the present disclosure.

In addition, the display control unit 104 changes an aspect of the virtual object moving across a boundary of a display area as in the first embodiment. Specifically, the display control unit 104 changes a movement speed of the virtual object while a part of the moving virtual object is positioned outside the display area on the basis of virtual movement information. Further, a display control process according to the present embodiment will be described with reference to FIG. 14. FIG. 14 is a diagram for describing a change example of an aspect of a virtual object according to the present embodiment.

First, the display control unit 104 acquires virtual movement information. For example, the display control unit 104 acquires virtual movement information representing a movement speed v of the virtual object. Note that the virtual movement information can acquire the information from an application provided separately from the information processing device 100-3 or an external device of the information processing device 100-3.

Next, the display control unit 104 determines whether to accelerate the virtual object on the basis of the virtual movement information. For example, the display control unit 104 estimates a position L1, i.e., a position 30I1, of a virtual object 20I in a next frame on the basis of the movement speed v of the virtual object represented by the virtual movement information and the position L of the virtual object 20I at the current time point. Next, the display control unit 104 determines whether the virtual object 20I protrudes from a view frustum 10F at the estimated position 30I1. Furthermore, the display control unit 104 estimates a position L2, i.e., a position 30I2, of the virtual object 20I after a predetermined time m elapses. Then, the display control unit 104 determines whether the virtual object 20I completely deviates from the view frustum 10F at the estimated position 30I2. Note that, since the user does not move, the position of the view frustum 10F does not change.

In a case in which it is determined to accelerate the virtual object, the display control unit 104 sets an acceleration of the virtual object. For example, as least a part of the virtual object 20I is positioned outside the view frustum 10F in the next frame, i.e., at a position 40I1, and the entire virtual object 20I completely deviates from the view frustum 10F after the predetermined time m elapses, i.e., at a position 40I2, as illustrated in FIG. 14. In this case, the display control unit 104 accelerates the virtual object 20I with an acceleration $\alpha$ in the direction of the speed v represented by the virtual movement information. That is, the virtual object 20I is moved toward the user at a speed of $v+\alpha*t$ (t: time). Therefore, the virtual object 20I disappears from the view frustum 10F earlier than in a case in which the movement speed of the virtual object 20I is not changed, and a time in which the view frustum 10F intersects with the virtual object 20I is shortened.

4-2. Process of Device

Figure 15:
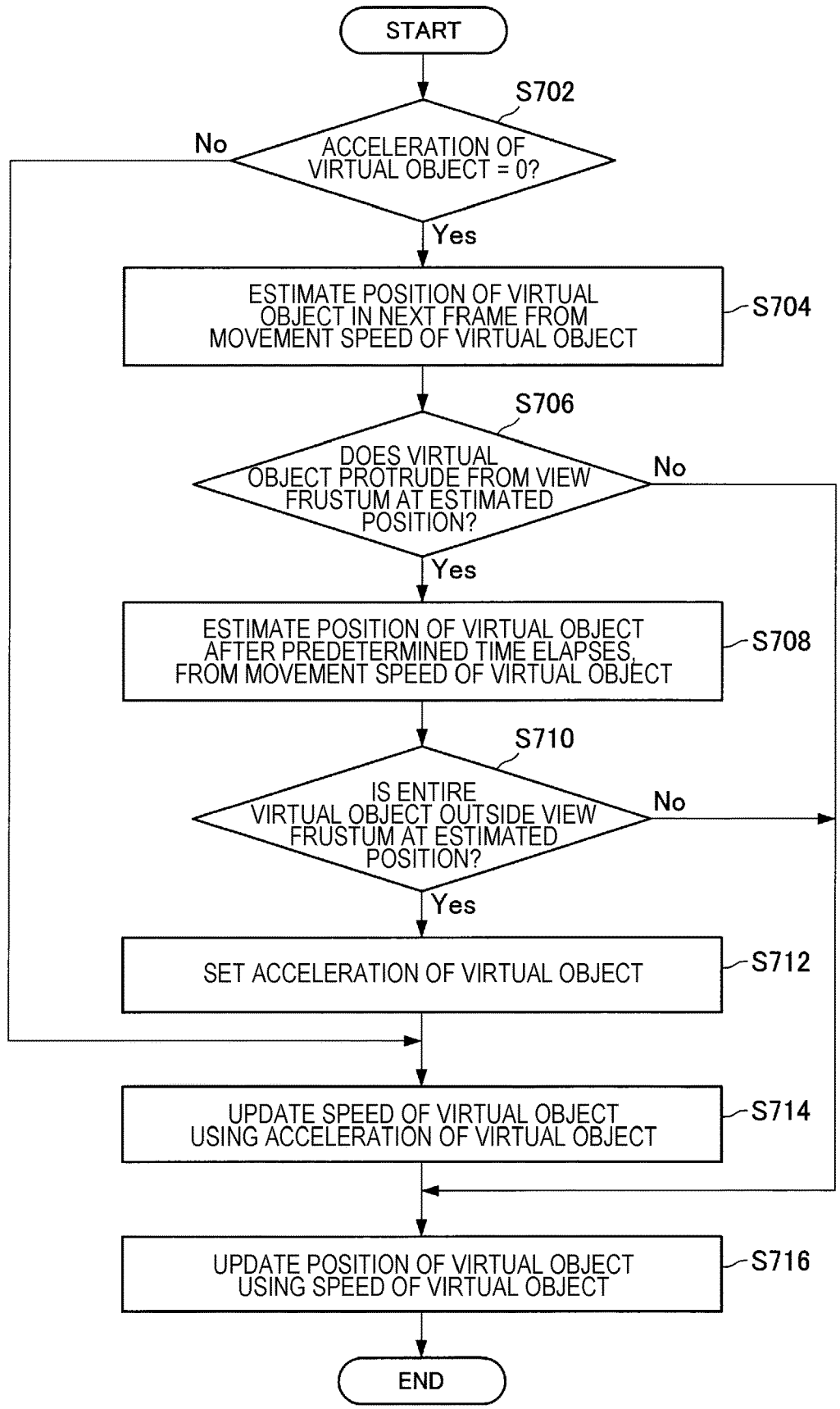
FIG. 15 is a flowchart conceptually showing an example of a process of an information processing device according to the embodiment.

Next, a process of the information processing device 100-3 according to the present embodiment will be described with reference to FIG. 15. FIG. 15 is a flowchart conceptually showing an example of a process of the information processing device 100-3 according to the present embodiment. Note that description of substantially the same process as the process of the first embodiment will be omitted.

The information processing device 100-3 determines whether an acceleration of the virtual object is 0 (Step S702), and if so, the information processing device estimates a position of the virtual object in a next frame from a movement speed of the virtual object (Step S704). Specifically, in a case in which the acceleration of the virtual object displayed in a display area is 0, the display control unit 104 calculates a movement speed v of the virtual object from acquired virtual movement information. Next, the display control unit 104 estimates the position L1 of the virtual object in the next frame (e.g., after 1/60 of a second) from the calculated movement speed v of the virtual object.

Next, the information processing device 100-3 determines whether the virtual object protrudes from the view frustum at the estimated position (Step S706), and if so, the information processing device estimates a position of the virtual object after the predetermined time elapses from the movement speed of the virtual object (Step S708). Specifically, in a case in which the virtual object protrudes from the view frustum at the estimated position L1 of the virtual object in the next frame, the display control unit 104 estimates the position L2 of the virtual object after the predetermined time elapses from the calculated movement speed v of the virtual object.

Next, the information processing device 100-3 determines whether the entire virtual object is positioned outside the view frustum at the estimated position (Step S710), and if so, the information processing device sets an acceleration of the virtual object (Step S712). Specifically, in a case in which the entire virtual object is positioned outside the view frustum at the estimated position L2 of the virtual object after the predetermined time elapses, the display control unit 104 sets the acceleration $\alpha$ in the movement direction of the virtual object as an acceleration of the virtual object.

Next, the information processing device 100-3 updates the speed of the virtual object using the acceleration of the virtual object (Step S714) and updates the position of the virtual object using the speed of the virtual object (Step S716).

4-3. Summary of Third Embodiment

As described above, according to the third embodiment of the present disclosure, the information processing device 100-3 controls display of the virtual object in accordance with the movement information of the virtual object in the virtual space. Thus, even in a case in which the virtual object moves in the display area in accordance with its motions in the virtual space regardless of motions of the user, the time in which the virtual object is displayed across the boundary of the display area can be shortened. Therefore, it is possible to prevent the user from being conscious of the boundary of the display area.

Note that, although the example in which the virtual object moves in the virtual space while the user stops has been described above, the user may move or rotate as described in the first or second embodiment while the virtual object moves in the virtual space.

5. Hardware Configuration of Information Processing Device According to One Embodiment of Present Disclosure The information processing devices 100 according to the respective embodiments of the present disclosure have been described above. The above-described processes of the information processing devices 100 are realized in cooperation with software and hardware of the information processing devices 100 to be described below.

FIG. 16 is an explanatory diagram illustrating a hardware configuration of an information processing device 100 according to an embodiment of the present disclosure. The information processing device 100 has a processor 132, a memory 134, a bridge 136, a bus 138, a measurement device 140, an input device 142, an output device 144, a connection port 146, and a communication device 148 as illustrated in FIG. 16.

(Processor)

The processor 132 functions as an arithmetic processing device and realizes the functions of the display control unit 104 included in the information processing device 100 in cooperation with various programs. The processor 132 operates various logical functions of the information processing device 100 by executing programs stored in the memory 134 or other storing media using a control circuit. The processor 132 can be, for example, a central processing unit (CPU), a graphics processing unit (GPU), a digital signal processor (DSP), or a system-on-a-chip (SoC).

(Memory)

The memory 134 stores programs, arithmetic parameters, or the like to be used by the processor 132. For example, the memory 134 includes a random access memory (RAM) and temporarily stores programs to be used in execution of the processor 132, parameters that are appropriately changed in execution, and the like. In addition, the memory 134 includes a read only memory (ROM) and realizes the function of the storage unit 106 with the RAM and the ROM. Note that an external storage device may be used as a part of the memory 134 via the connection port 146, the communication device 148, or the like.

Note that the processor 132 and the memory 134 are connected by an internal bus including a CPU bus or the like.

(Bridge and Bus)

The bridge 136 connects buses. Specifically, the bridge 136 connects the internal bus connecting the processor 132 and the memory 134 to the bus 138 connecting the measurement device 140, the input device 142, the output device 144, the connection port 146, and the communication device 148.

(Measurement Device)

The measurement device 140 performs measurement with respect to the information processing device 100 and its surroundings and realizes the function of the measurement unit 102. Specifically, the measurement device 140 includes a camera sensor (which may be stereoscopic), an acceleration sensor, an angular velocity sensor, a geomagnetic sensor, or a GPS sensor, and generates measurement information as sensor information from signals obtained from those sensors.

(Input Device)

The input device 142 is used by a user to operate the information processing device 100 or to input information to the information processing device 100. The input device 142 is composed of, for example, an input means for inputting information by the user, an input control circuit for generating an input signal on the basis of the input of the user and outputting the signal to the processor 132, and the like. Note that the input means may be a mouse, a keyboard, a touch panel, a switch, a lever, a microphone, or the like. The user of the information processing device 100 can input various kinds of data or instruct processing operations to the information processing device 100 by operating the input device 142.

(Output Device)

The output device 144 is used to notify the user of information. The output device 144 is, for example, a transmissive-type HMD or a head-up display (HUD) or a retinal projection display device, and realizes the function of the display unit 108. Note that, as the output device 144, a liquid crystal display (LCD) device, an organic light emitting diode (OLED) device, a device such as a projector, a speaker, or a headphone, or a module that performs output to such devices may be included.

(Connection Port)

The connection port 146 is a port for directly connecting apparatuses to the information processing device 100. The connection port 146 can be, for example, a Universal Serial Bus (USB) port, an IEEE 1394 port, a small computer system interface (SCSI) port, or the like. In addition, the connection port 146 may be an RS-232C port, an optical audio terminal, a High-Definition Multimedia Interface (HDMI) (registered trademark) port, or the like. By connecting an external apparatus to the connection port 146, data can be exchanged between the information processing device 100 and the external apparatus.

(Communication Device)

The communication device 148 mediates communication between the information processing device 100 and external devices. Specifically, the communication device 148 executes communication in compliance with a wireless communication scheme. The communication device 148 may execute wireless communication in compliance with an arbitrary wireless communication scheme, for example, a short-range wireless communication scheme such as Bluetooth (registered trademark), near field communication (NFC), a wireless USB, or TransferJet (registered trademark), a cellular communication scheme such as Wideband Code Division Multiple Access (WCDMA) (registered trademark), WiMAX (registered trademark), Long Term Evolution (LTE), or LTE-A, or a wireless local area network (LAN) scheme such as Wi-Fi registered trademark). In addition, the communication device 148 ay execute wired communication such as signal line communication or wired LAN communication.

Note that the information processing device 100 may not have some of the configurations described using FIG. 16 or may have an additional configuration. In addition, a one-chip information processing module in which all or some of the configurations described using FIG. 16 are integrated may be provided.

6. Conclusion

According to the first embodiment of the present disclosure described above, by changing the aspect of the virtual object into the aspect in which it is difficult for the user to notice the state of the virtual object protruding from the display area, it is possible to prevent the user from being conscious of the boundary of the display area. Therefore, it is possible to suppress deterioration of a sense of immersion or a sense of reality of the user with respect to the virtual object displayed in the display area.

In addition, according to the second embodiment of the present disclosure, it is possible to prevent the user from being conscious of the boundary of the display area in the case in which the user rotates.

In addition, according to the third embodiment of the present disclosure, even in the case in which the virtual object moves in the display area in accordance with motions thereof in the virtual space regardless of motions of the user, the time in which the virtual object is displayed across the boundary of the display area can be shortened. Therefore, it is possible to prevent the user from being conscious of the boundary of the display area.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although other control is set to be added to control in accordance with movement information in the embodiments, for example, the present technology is not limited thereto. As described in the embodiments, another control method may be used as long as an aspect of the virtual object can be changed. Specifically, the display control unit 104 may change control itself in accordance with movement information. For example, the display control unit 104 may change a movement speed of the virtual object whose display position is moved in accordance with a movement speed of a user represented by measurement information, or may rotate an attitude of the virtual object whose display position is moved in accordance with a rotation direction of the user represented by measurement information by a predetermined angle.

In addition, although the example in which the virtual object moves outside the display area and disappears has been mainly described in the embodiments, the configuration of each embodiment of the present disclosure may be applied to a case in which a virtual object moves from outside to inside a display area and thereby is newly displayed as in the second embodiment.

In addition, although the example in which the aspects are changed in the case in which the virtual object protrudes from the view frustum in the next frame has been described in the embodiments, the aspects may be changed in a case in which the virtual object protrudes from the view frustum in a frame two or more frames ahead.

In addition, although all processes are set to be performed by the information processing devices 100 in the embodiments, some processes may be performed by another device. For example, each information processing device 100 may be a server device, and a device worn by a user may perform processes of the measurement unit 102 and the display unit 108. In this case, measurement information is transmitted to the information processing device 100 via communication, and instruction information to the display unit 108 is transmitted from the information processing device 100.

In addition, although the example in which the movement direction of the virtual object is the left-right direction, i.e., the horizontal direction, of the visual field of the user has been described as a part in the embodiments, the movement direction of the virtual object may be the up-down direction, i.e., the vertical direction. In addition, the virtual object aspect control of the embodiments may be applied only to movement of the virtual object in a predetermined direction. For example, the control may be performed only in the left-right direction and the control may not be performed in the up-down direction.

Note that the virtual object aspect control of the embodiments may be performed in accordance with properties of the virtual object. For example, properties of the virtual object include importance, priority, type, application, size, and the like of the virtual object. The properties of the virtual object may be associated with the virtual object as meta information.

In addition, the virtual object aspect control of the embodiments may be performed on the basis of a line of sight of a user. For example, the information processing device 100 detects a line of sight of a user and performs the virtual object aspect control of the embodiments only for the virtual object positioned on the detected line of sight. In addition, the information processing device 100 may perform the virtual object aspect control of the embodiments only in the vicinity of the detected line of sight in the display area.

Further, the effects described in this specification are merely illustrative or exemplified effects, and are not limitative. That is, with or in the place of the above effects, the technology according to the present disclosure may achieve other effects that are clear to those skilled in the art from the description of this specification.

Further, steps illustrated in the flowcharts of the above embodiment include not only processes which are chronologically performed in accordance with the described order but also processes which are not necessarily chronologically performed but performed in parallel or individually as well. Further, it is needless to say that even in steps which are processed chronologically, the order can be appropriately changed depending on circumstances.

In addition, a computer program for causing a computer system to exhibit functions equivalent to those of the above-described respective logical configurations of the information processing device 100 can be produced as well. In addition, a storage medium in which the computer program is stored may also be provided. Here, the computer system includes a single computer like the hardware mounted in the information processing device 100 or a plurality of computers that execute a series of processes.

Additionally, the present technology may also be configured as below.

(1)
An information processing device including:
a display control unit configured to
control display of a virtual object displayed to be moved in a display area, and
change an aspect of the virtual object when the virtual object moves across a boundary of the display area.

(2)
The information processing device according to (1),
in which the change in the aspect of the virtual object includes a change into an aspect different from an aspect corresponding to movement information related to movement of the virtual object.

(3)
The information processing device according to (2),
in which the virtual object is superimposed on an outside world image, and the display area overlaps a part of the outside world image.

(4)
The information processing device according to (2) or (3),
in which the display control unit changes the aspect of the virtual object while a part of the virtual object is positioned outside the display area.

(5)
The information processing device according to any one of (2) to (4),
in which the display control unit changes the aspect of the virtual object while a part of the virtual object in the aspect corresponding to the movement information is estimated to be positioned outside the display area.

(6)
The information processing device according to any one of (2) to (5),
in which the change in the aspect of the virtual object includes a change in a movement speed of the virtual object.

(7)
The information processing device according to any one of (2) to (6),
in which the change in the aspect of the virtual object includes a change in a movement direction of the virtual object.

(8)
The information processing device according to (7),
in which the change in the movement direction includes a change into a direction perpendicular to a side of a view frustum relating to a visual field of a user.

(9)
The information processing device according to any one of (2) to (8),
in which the change in the aspect of the virtual object includes a change in an attitude of the virtual object.

(10)
The information processing device according to (9),
in which the change in the attitude includes rotation of the virtual object in a direction parallel to a side of a view frustum relating to a visual field of a user.

(11)
The information processing device according to any one of (2) to (10),
in which the change in the aspect of the virtual object includes a change in a size of the virtual object.

(12)
The information processing device according to any one of (2) to (11),
in which the change in the aspect of the virtual object includes a change in transparency of the virtual object.

(13)
The information processing device according to any one of (2) to (12),
in which a degree of the change in the aspect of the virtual object changes in accordance with movement of the virtual object.

(14)

The information processing device according to any one of (2) to (13), in which the display control unit gives a visual effect to the virtual object while the aspect of the virtual object is changed.

(15)

The information processing device according to (14), in which the visual effect includes a change in a contrast between the virtual object and the display area, a change in brightness of the virtual object, or blurring.

(16)

The information processing device according to any one of (2) to (15), in which the movement information includes sensor information relating to a motion of a user.

(17)

The information processing device according to any one of (2) to (16), in which, in a case in which the virtual object moves from an outside to an inside of the display area, the display control unit causes the virtual object not to be displayed in the display area until an area in which the entire virtual object is to be displayed is secured.

(18)

The information processing device according to any one of (2) to (17), in which the movement information includes movement information of the virtual object in a virtual space.

(19)

An information processing method performed using a processor, the information processing method including:

controlling display of a virtual object displayed to be moved in a display area, and changing an aspect of the virtual object when the virtual object moves across a boundary of the display area.

(20)

A program for causing a computer system to achieve:

a display control function of controlling display of a virtual object displayed to be moved in a display area, and changing an aspect of the virtual object when the virtual object moves across a boundary of the display area.

REFERENCE SIGNS LIST 10 view frustum (display area)
20 virtual object
100 information processing device
102 measurement unit
104 display control unit
106 storage unit
108 display unit

The invention claimed is:

1. An information processing device, comprising:
a display control unit configured to:
control display of a virtual object in a display area;
determine the virtual object is deviated from a view frustum associated with a user's visual field; and
change an aspect of the virtual object based on the determination.

2. The information processing device according to claim 1, wherein the change in the aspect of the virtual object includes a change in movement of the virtual object.

3. The information processing device according to claim 2, wherein the virtual object is superimposed on an outside world image, and the display area overlaps a part of the outside world image.

4. The information processing device according to claim 2, wherein the display control unit is further configured to change the aspect of the virtual object when a part of the virtual object is outside the display area.

5. The information processing device according to claim 2, wherein the display control unit is further configured to change the aspect of the virtual object when, subsequent to the movement of the virtual object, a part of the virtual object is estimated to be outside the display area.

6. The information processing device according to claim 2, wherein the change in the aspect of the virtual object includes a change in a movement speed of the virtual object.

7. The information processing device according to claim 2, wherein the change in the aspect of the virtual object includes a change in a movement direction of the virtual object.

8. The information processing device according to claim 7, wherein the movement direction is changed to a direction perpendicular to a side of the view frustum associated with the user's visual field.

9. The information processing device according to claim 2, wherein the change in the aspect of the virtual object includes a change in an attitude of the virtual object.

10. The information processing device according to claim 9, wherein the change in the attitude includes rotation of the virtual object in a direction parallel to a side of the view frustum associated with the user's visual field.

11. The information processing device according to claim 2, wherein the change in the aspect of the virtual object includes a change in a size of the virtual object.

12. The information processing device according to claim 2, wherein the change in the aspect of the virtual object includes a change in transparency of the virtual object.

13. The information processing device according to claim 2, wherein a degree of the change in the aspect of the virtual object changes based on the movement of the virtual object.

14. The information processing device according to claim 2, wherein the display control unit is configured to display a visual effect on the virtual object when the aspect of the virtual object is changed.

15. The information processing device according to claim 14, wherein the visual effect includes:
a change in a contrast value between the virtual object and the display area,
a change in a brightness value of the virtual object, and
a blurring effect on the virtual object.

16. The information processing device according to claim 2, wherein the display control unit is further configured to change the aspect of the virtual object based on movement information associated with a user's motion.

17. The information processing device according to claim 2, wherein, in a case in which the virtual object moves from an outside portion to an inside portion of the display area, the display control unit is further configured to prevent display of the virtual object in the display area, until the virtual object is entirely in the inside portion of the display area.

18. The information processing device according to claim 1, wherein the display control unit is further configured to change the aspect of the virtual object based on movement information of the virtual object in a virtual space.

19. An information processing method, the information processing method comprising:
- controlling display of a virtual object in a display area;
- determining the virtual object is deviated from a view frustum associated with a user's visual field; and
- changing an aspect of the virtual object based on the determination.

20. A non-transitory computer-readable medium having stored thereon computer-executable instructions which, when executed by a processor of an information processing device, cause the processor of the information processing device to execute operations, the operations comprising:
- controlling display of a virtual object in a display area;
- determining the virtual object is deviated from a view frustum associated with a user's visual field; and
- changing an aspect of the virtual object based on the determination.

* * * * *